(12) United States Patent
Saeda et al.

(10) Patent No.: US 11,467,782 B2
(45) Date of Patent: Oct. 11, 2022

(54) IMAGE FORMING SYSTEM, MOBILE COMMUNICATION TERMINAL, IMAGE FORMING DEVICE, AND IMAGE FORMING METHOD WITH DATA LOCATION DETECTION

(71) Applicant: SHARP KABUSHIKI KAISHA, Sakai (JP)

(72) Inventors: Masao Saeda, Sakai (JP); Yasuhiro Nakai, Sakai (JP); Kohji Katamoto, Sakai (JP); Kohichi Murakami, Sakai (JP); Yasutomo Hayano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/372,156

(22) Filed: Jul. 9, 2021

(65) Prior Publication Data

US 2022/0019387 A1 Jan. 20, 2022

(30) Foreign Application Priority Data

Jul. 16, 2020 (JP) .............................. JP2020-122118

(51) Int. Cl.
*G06F 3/12* (2006.01)
(52) U.S. Cl.
CPC .......... *G06F 3/1205* (2013.01); *G06F 3/1222* (2013.01); *G06F 3/1238* (2013.01); *G06F 3/1292* (2013.01)
(58) Field of Classification Search
None
See application file for complete search history.

(56) References Cited

U.S. PATENT DOCUMENTS

2013/0050743 A1* 2/2013 Steely .................. G06F 3/1204
358/1.15

FOREIGN PATENT DOCUMENTS

| CA | 2759771 A1 * | 12/2003 | ........... G06F 3/1204 |
|---|---|---|---|
| JP | 2002-278870 A | 9/2002 | |
| JP | 2005-020489 A | 1/2005 | |
| JP | 2014085953 A | 5/2014 | |
| JP | 2014186686 A | 10/2014 | |
| JP | 2016151905 A | 8/2016 | |

* cited by examiner

*Primary Examiner* — Thomas D Lee
(74) *Attorney, Agent, or Firm* — ScienBiziP, P.C.

(57) ABSTRACT

An image forming system includes a mobile communication terminal, and an image forming device. The mobile communication terminal includes memory that stores data, a location determiner that accepts specifying of data and instruction for printing the specified data and determines whether data is stored in memory or stored in an accessible external device, and a print instructor that, in a case where data is stored in the memory, sends data to the image forming device together with the print instruction, and in a case where data is stored in the external device, sends access information, which is for accessing data, to the image forming device, together with the print instruction. The image forming device includes a controller that, when receiving data together with the print instruction, prints the received data, and when receiving the access information together with the print instruction, acquires and prints data stored in the external device.

8 Claims, 18 Drawing Sheets

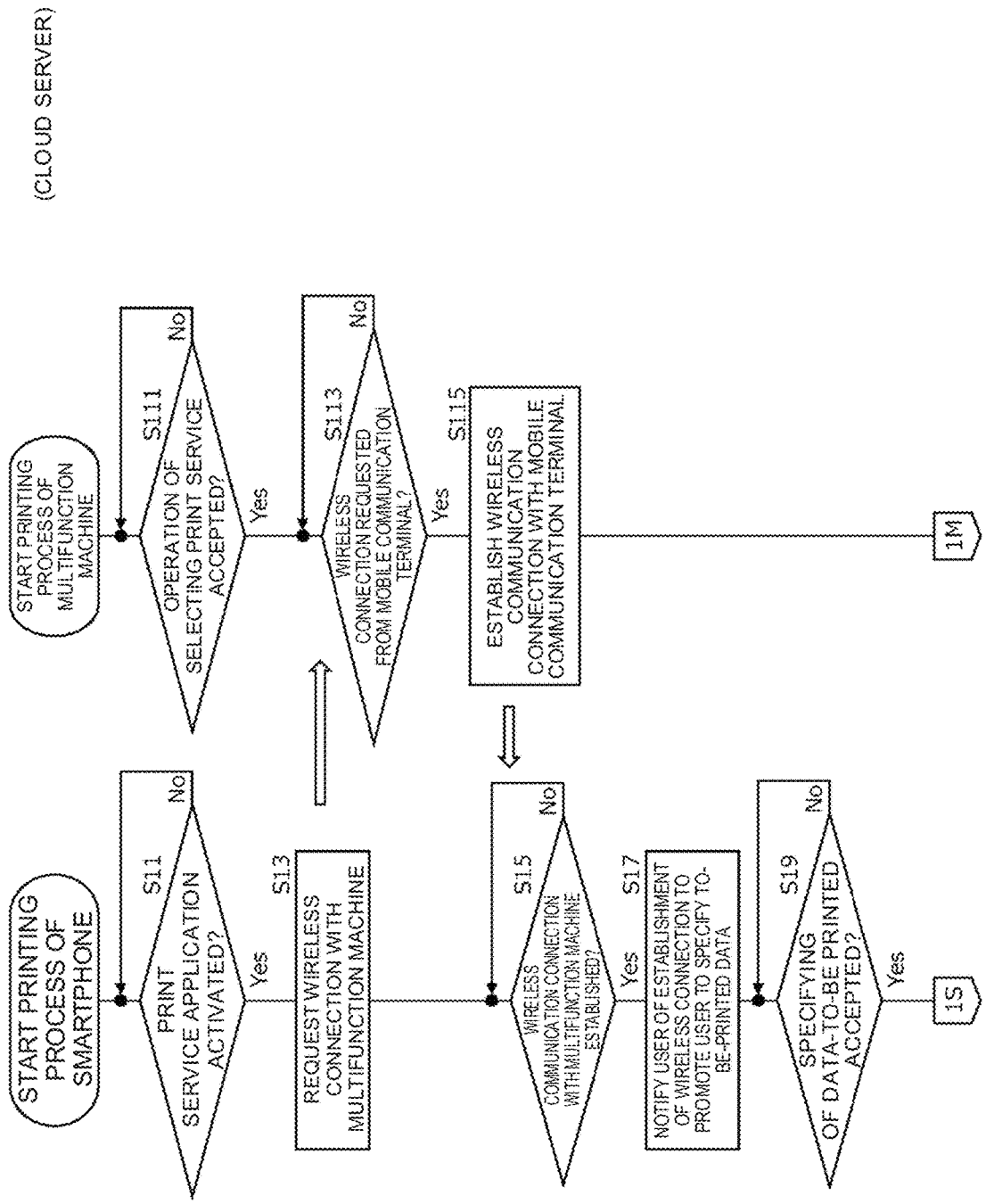

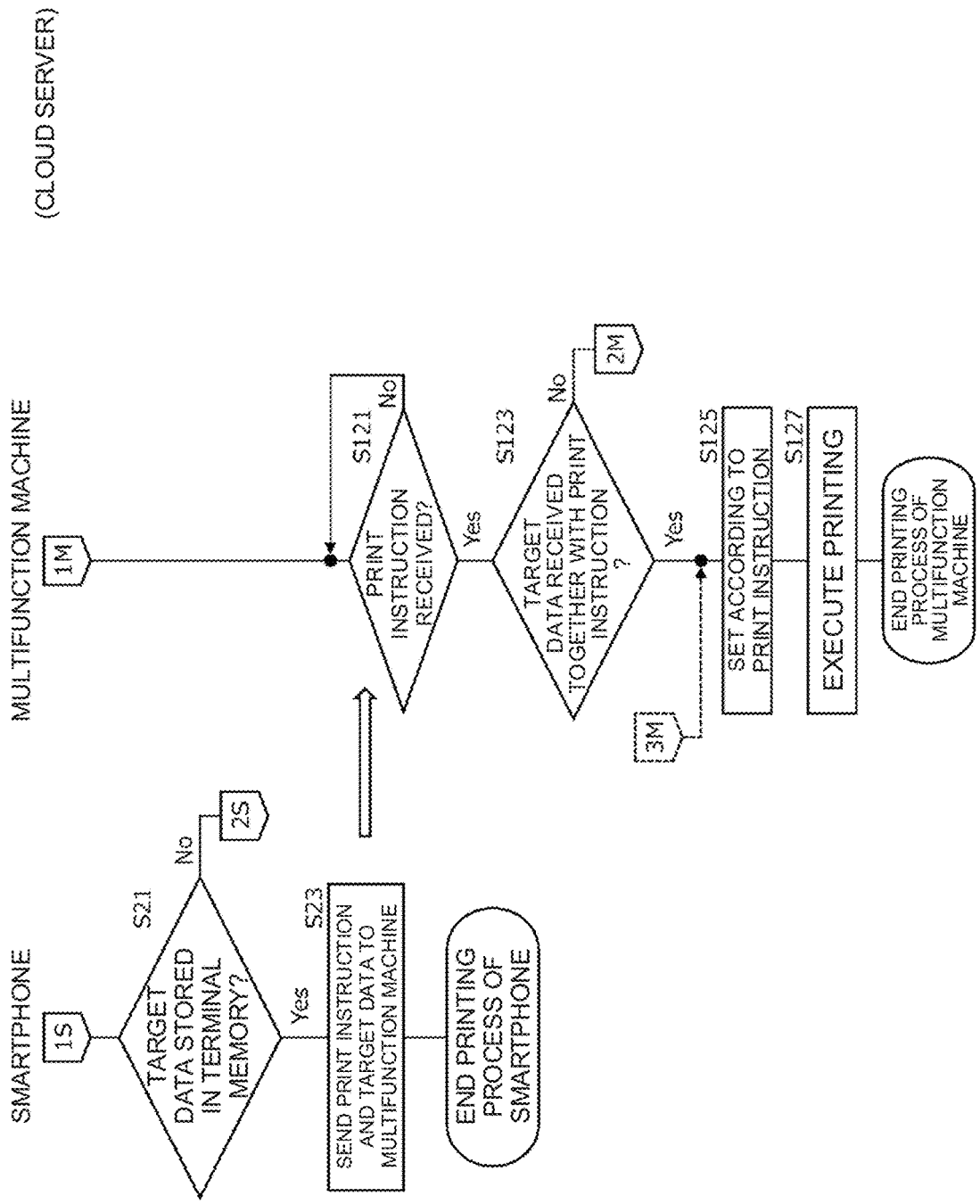

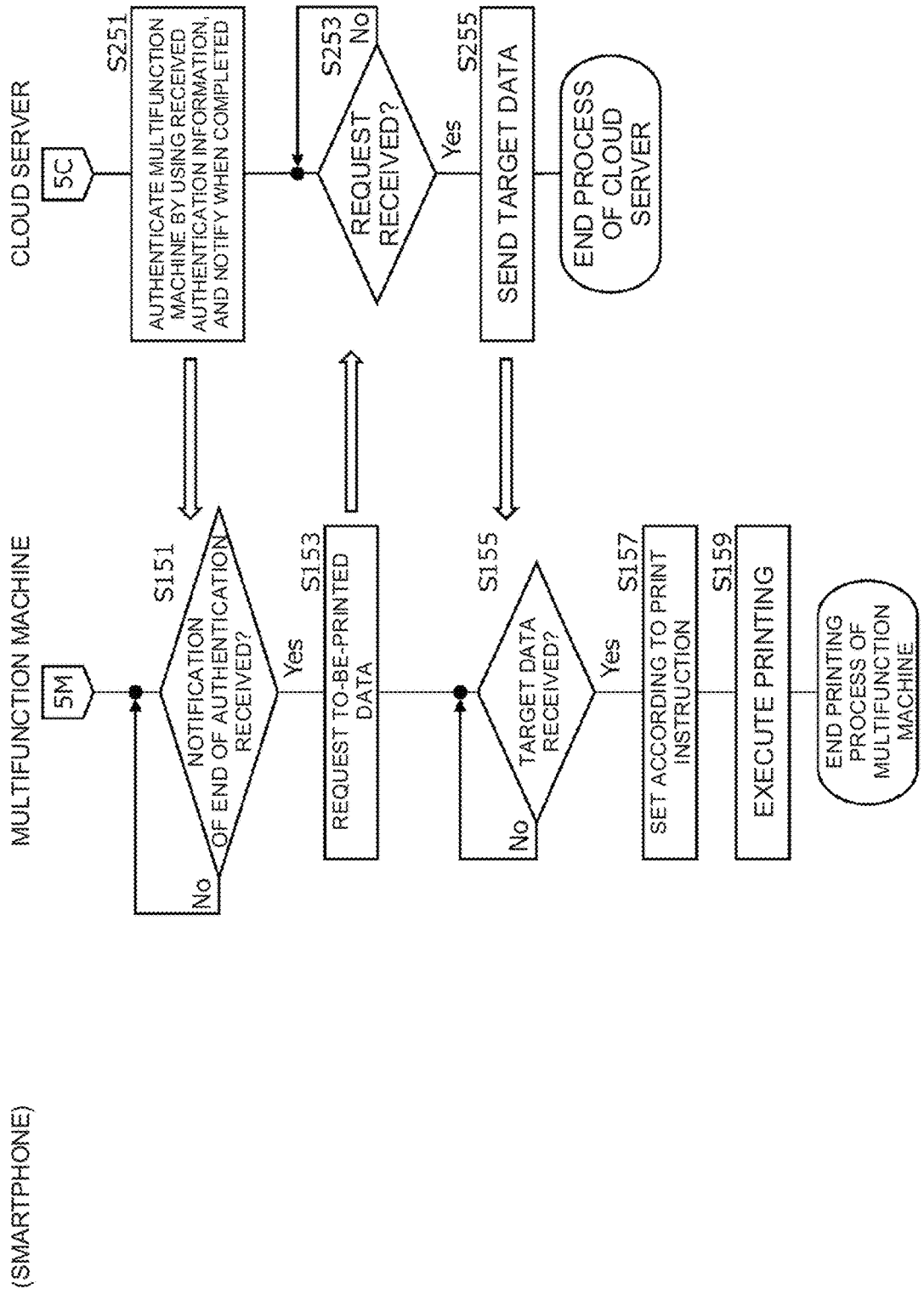

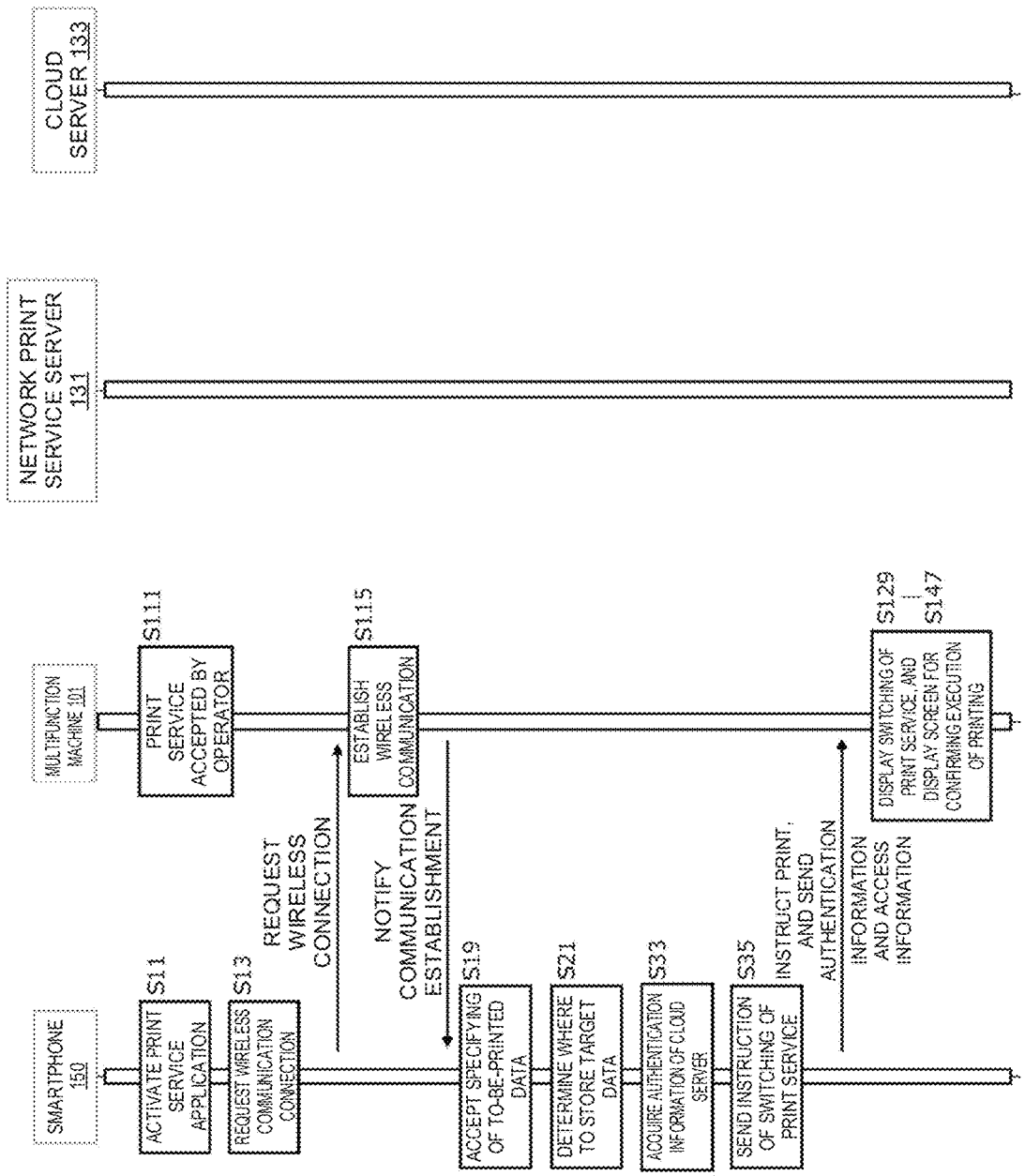

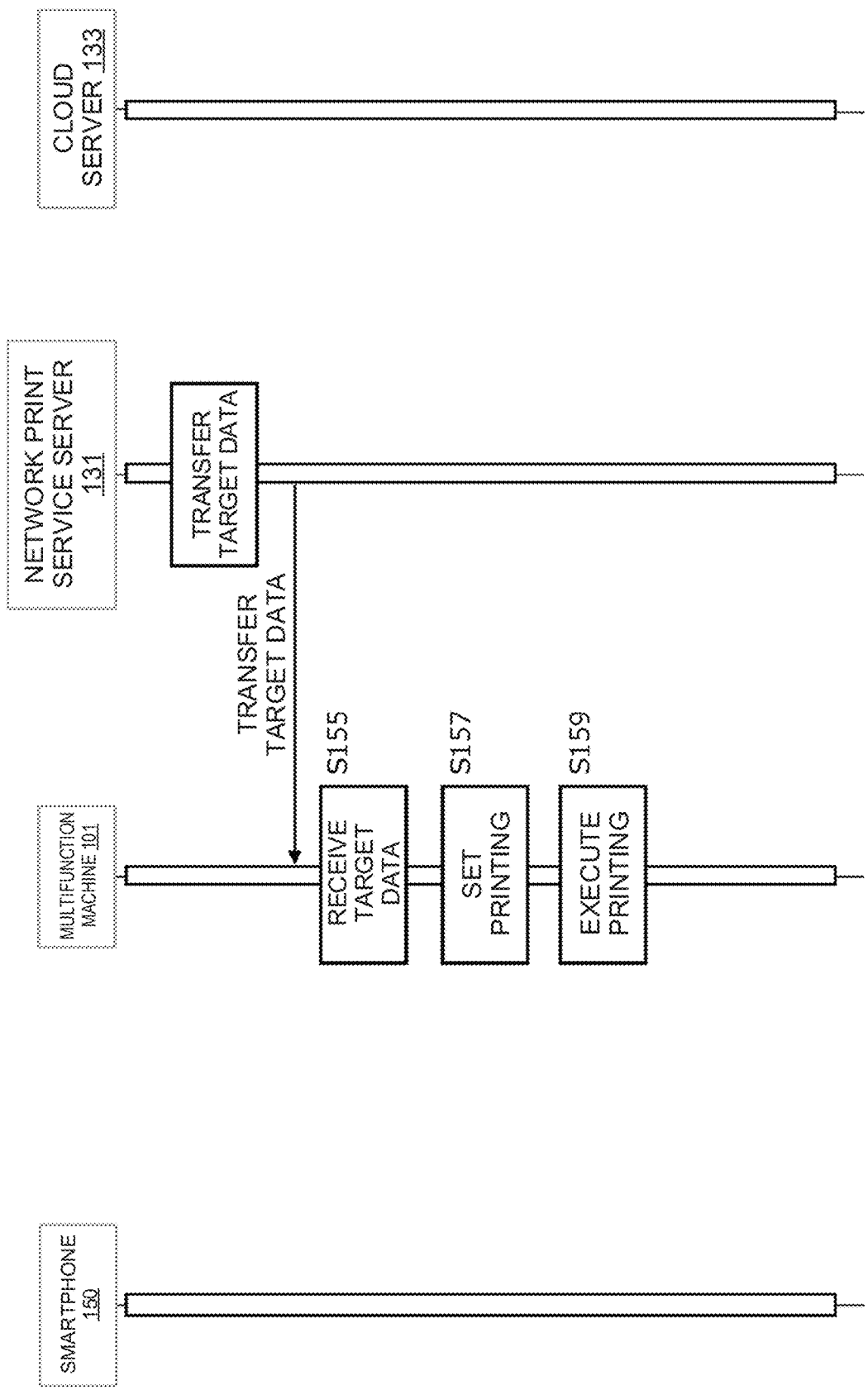

IMAGE FORMING SYSTEM, MOBILE COMMUNICATION TERMINAL, IMAGE FORMING DEVICE, AND IMAGE FORMING METHOD WITH DATA LOCATION DETECTION

BACKGROUND OF THE INVENTION

Field of the Invention

The present invention relates to an image forming system, a mobile communication terminal, an image forming device, and an image forming method, and more specifically, relates to the image forming system, the mobile communication terminal, the image forming device, and the image forming method that receive a print instruction from the mobile communication terminal and print data.

Description of the Background Art

There is known an image forming device in which a user, on a mobile communication terminal, specifies data such as photographs stored in the mobile communication terminal such as a smartphone or data stored in an external device accessible from the mobile communication terminal, and the specified data is printed.

For example, the following system has been proposed, with respect to a process that sends data, which is stored in a mobile communication terminal, to an image forming device, and prints the data. A communication device such as a digital still camera having a display, a mobile phone, or a PDA communicates wirelessly with a printer. With this, image data or the like is sent and received between the two, and an image is displayed on the display mounted on the communication device. With such a configuration, the system is capable of execute printing without equipping the printer with a display for image confirmation or an operation panel for instructing selection of the image (see, for example, Japanese Unexamined Patent Application Publication No. 2005-020489).

Further, for example, the following system has been proposed for an aspect that prints data stored in an external device accessible from a mobile communication terminal. This is a network print system that executes printing out with a printer at a store where the printer is installed, such as a convenience store, based on a print instruction by an operation from a user's mobile terminal. The file stored in a file server of the on-site LAN is selected and printed out from the printer. To achieve this, an application server that can communicate with an on-site file server via the gateway is placed on the Internet. The mobile terminal acquires the file list information stored in the on-site file server via the application server. Then, the mobile terminal sends a print data creation request to the application server, and the application server sends the request to the on-site file server and acquires the specified file. The application server that has acquired the file generates print data and sends the print data to the printer. The printer prints the received print data (see, for example, Japanese Unexamined Patent Application Publication No. 2002-278870).

In recent years, the processing capability of mobile communication terminals represented by smartphones has been improved, and multi-functionality and high functionality are progressing. However, with the multi-functionality and high functionality progressing, a user interface that is easy for a user to handle and understand is desired. In this regard, there has been introduced a user interface designed to seamlessly handle, whether the data generated by the mobile communication terminal is stored in the local memory or in the cloud server, both the local memory and the cloud server. Combined with the high speed of communication and the large capacity of communication capacity, the difference in response speed between the two is small, and even if the two are handled seamlessly, the user does not feel uncomfortable.

To give a specific example, there is a case where data such as photograph taken with a smartphone seems to be stored in a local memory at first glance, but is actually stored in a cloud server. A list (thumbnail) is displayed without the user being aware of the location of the data, and selection of the data is accepted. When the data is selected, not only display is enlarged but also an instruction for printing the selected data is accepted.

SUMMARY OF THE INVENTION

Even with the seamless user interface as described above, the procedure of the process related to printing varies depending on whether the to-be-printed data is stored in the local memory of the mobile communication terminal or stored in a device external to the mobile communication terminal. The conventional solution to this is that the user should explicitly specify the location of the data.

However, when the seamless user interface is introduced as described above, the user does not understand the location of the data. For example, since a thumbnail or the like of the data is displayed on the display screen of the mobile communication terminal, the user understands that the displayed data is stored in the local memory of the mobile communication terminal and specifies the data. However, the data is actually stored on the cloud server. Despite the local memory specified as the location of the data, the task of printing process processes it as an error unless the data is not saved in the local memory. However, the user does not know why the error message is displayed. Such a contradiction may occur.

The present invention has been made in consideration of the above circumstances, and provides an image forming system, an image forming device, a mobile communication terminal, and an image forming method each capable of execute printing even when the user cannot recognize the location of the data for which printing is specified.

The present invention provides an image forming system, including: a mobile communication terminal; and an image forming device, wherein the mobile communication terminal and the image forming device are capable of communicating with each other, the mobile communication terminal includes: a memory that stores data, a location determiner that accepts specifying of the data by a user and an instruction for printing the specified data and determines whether the data is stored in the memory or stored in an accessible external device, and a print instructor that, in a case where the data is stored in the memory, sends the stored data to the image forming device together with the print instruction, and in a case where the data is stored in the external device, sends access information, which is for accessing the data stored in the external device, to the image forming device, together with the print instruction, and the image forming device includes: a controller that, in a case of receiving the data together with the print instruction, prints the received data, and in a case of receiving the access information together with the print instruction, acquires and prints the data stored in the external device.

Further, from another aspect, the present invention provides an image forming device, including: a controller that receives a print instruction from an external mobile communication terminal capable of communicating and performs printing, wherein the mobile communication terminal has a memory, which stores data, and has a print instructor, the print instructor accepts specifying of the data by a user and an instruction for printing the specified data and determines whether the data is stored in the memory or stored in an accessible external device, in a case where the data is stored in the memory, sends the stored data together with the print instruction, and in a case where the data is stored in the external device, sends access information, which is for accessing the data stored in the external device, together with the print instruction, and the controller, in a case of receiving the data together with the print instruction, prints the received data, and in a case of receiving the access information together with the print instruction, acquires and prints the data stored in the external device.

Further, from still another aspect, the present invention provides a mobile communication terminal, including: a memory that stores data; a location determiner that accepts specifying of the data by a user and an instruction for printing the specified data and determines whether the data is stored in the memory or stored in an accessible external device; and a print instructor that, in a case where the data is stored in the memory, sends the stored data to an image forming device together with the print instruction, and in a case where the data is stored in the external device, sends access information, which is for accessing the data stored in the external device, to the image forming device, together with the print instruction, wherein the image forming device is, with the data received together with the print instruction, caused to print the received data, and, with the access information received together with the print instruction, caused to acquire and print the data stored in the external device.

Further, from further another aspect, the present invention provides an image forming method, including the following doings by a controller of a mobile communication terminal having a memory capable of storing data: accepting specifying of the data by a user and an instruction for printing the specified data; determining whether the specified data is stored in the memory or stored in an accessible external device; and in a case where the data is stored in the memory, sending the stored data to an image forming device together with the print instruction, and in a case where the data is stored in the external device, sending access information, which is for accessing the data stored in the external device, to the image forming device, together with the print instruction, and the image forming device is, with the data received together with the print instruction, caused to print the received data, and, with the access information received together with the print instruction, caused to acquire and print the data stored in the external device.

In an image forming system according to the present invention, the mobile communication terminal includes a location determiner that determines whether the specified data is stored in the memory or stored in an accessible external device, and a print instructor that, in a case where the data is stored in the memory, sends the stored data together with the print instruction, and in a case where the data is stored in the external device, sends access information, which is for accessing the data stored in the external device, together with the print instruction, and the image forming device includes a controller that, in a case of receiving the data together with the print instruction, prints the received data, and in a case of receiving the access information together with the print instruction, acquires and prints the data stored in the external device. Therefore, printing can be executed even when the user cannot recognize the location of the data for which printing is specified.

The same applies to the image forming device, the mobile communication terminal, and the image forming method according to the present invention.

BRIEF DESCRIPTION OF THE DRAWINGS

FIG. 5A is a first flowchart showing a flow of processes for executing an operation related to printing from a smartphone, in the embodiment of the present invention.

FIG. 5B is a second flowchart showing a flow of processes for executing an operation related to printing from a smartphone, in the embodiment of the present invention.

FIG. 5E is a fifth flowchart showing a flow of processes for executing an operation related to printing from a smartphone, in the embodiment of the present invention.

FIG. 11A is a first sequence diagram showing a flow of printing processes, in the embodiment of the present invention (when the target data of the cloud server is accessed via the print service server).

FIG. 11C is a third sequence diagram showing a flow of printing processes, in the embodiment of the present invention (when the target data of the cloud server is accessed via the print service server).

DESCRIPTION OF THE PREFERRED EMBODIMENTS

The present invention will now be described in further detail with reference to the accompanying drawings. Note that the following explanations are mere examples in all respects, and should not be construed as limiting the present invention.

Structure of Image Forming System

First, an image forming system according to an embodiment of the present invention will be described.

Figure 1:
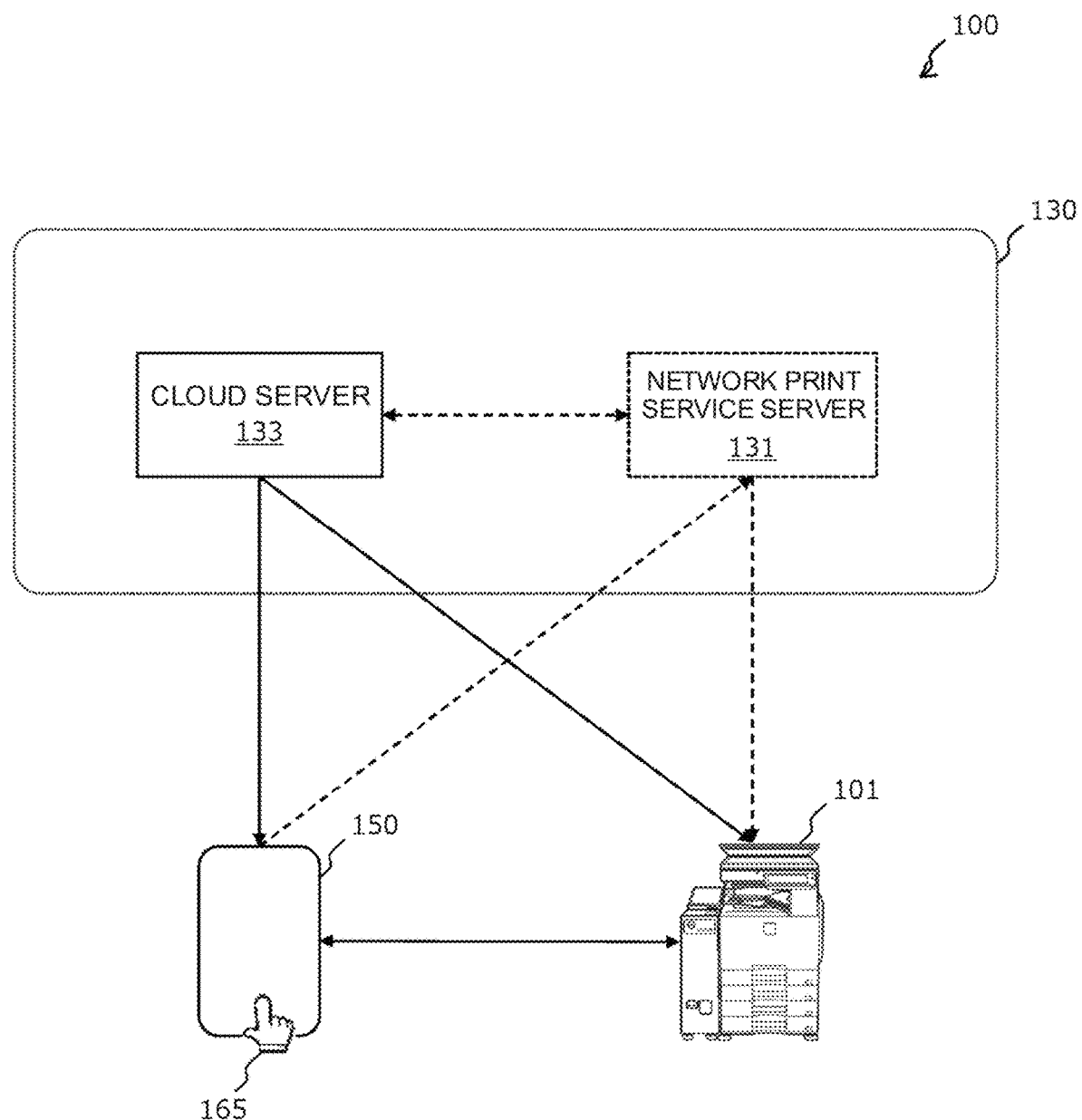
FIG. 1 is a block diagram showing a configuration of an image forming system according to an embodiment of the present invention.

FIG. 1 is a block diagram showing a configuration of an image forming system according to this embodiment.

As shown in FIG. 1, an image forming system 100 in this embodiment includes a multifunction machine 101 as an image forming device and a smartphone 150 as a mobile communication terminal. FIG. 1 further shows a network print service server 131 and a cloud server 133 as external devices 130 other than the image forming system 100. As shown in FIG. 1, the multifunction machine 101 and the smartphone 150 can communicate with each other. In this embodiment, when the smartphone 150 approaches the multifunction machine 101 and enters the communicable range of short-range wireless communication such as Wi-Fi, Bluetooth (registered trademark) or NFC, mutual wireless communication is possible.

Further, in this embodiment, the multifunction machine 101 and the smartphone 150 can communicate with the external device 130. As the external device 130, the cloud server 133 is shown in FIG. 1 (first embodiment). According to the first embodiment, the multifunction machine 101 and the smartphone 150 communicate directly with the cloud server 133. This communication is shown by a solid line in FIG. 1.

Further, as the external device 130, there is also an aspect in which the network print service server 131 exists in addition to the cloud server 133 (second embodiment). The network print service server 131 that does not exist in the first embodiment but exists in the second embodiment is shown by a chain line.

According to the second embodiment, the multifunction machine 101 and the smartphone 150 communicate with the cloud server 133 via the network print service server 131. The multifunction machine 101 and the smartphone 150 do not directly communicate with the cloud server 133. The communication is shown by a chained arrow in FIG. 1.

First, a process related to printing will be described on the premise of the first embodiment in which the network print service server 131 does not exist as the external device 130. After that, the second embodiment will be described below.

In the first embodiment, the user operates the smartphone 150 thereby to specify the to-be-printed data, and sends an instruction to the multifunction machine 101 to print the data. FIG. 1 shows fingers 165 of the user who operates the smartphone 150.

Figure 2:
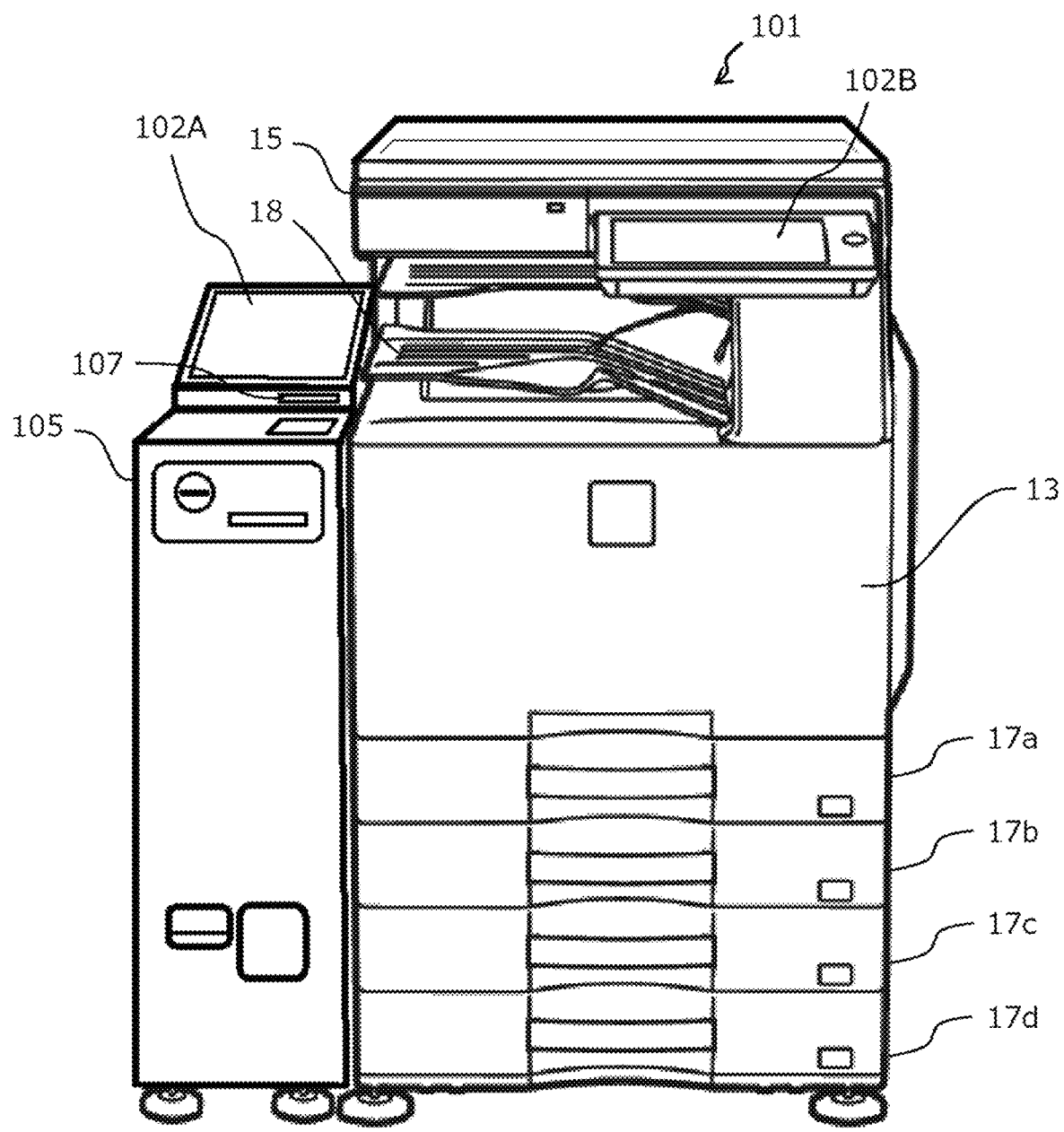
FIG. 2 is an example of an image forming device which is a composing element of the image forming system of FIG. 1, and is an external view of a multifunction machine installed in a convenience store or the like and used by an unspecified user.
Figure 3:
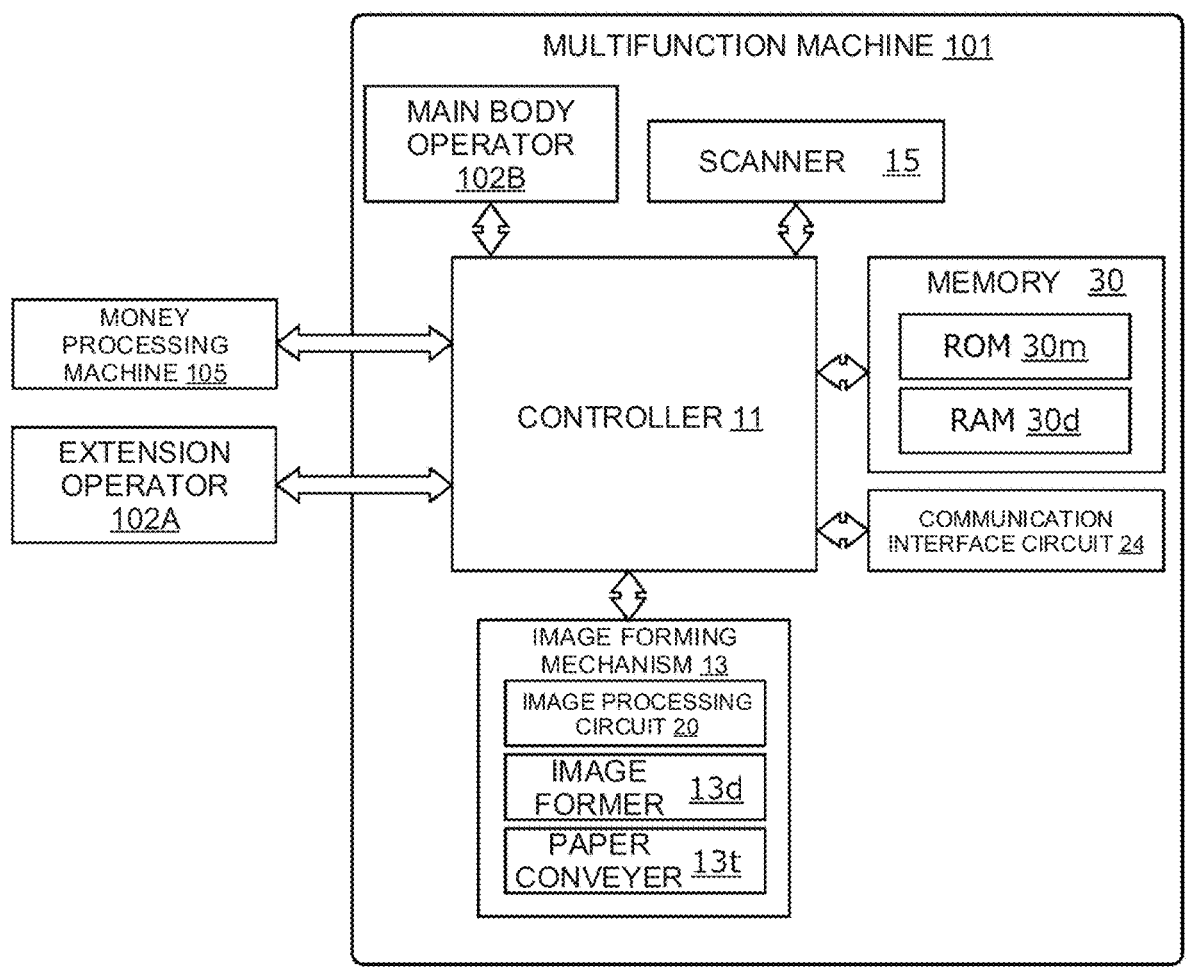
FIG. 3 is a block diagram showing a configuration of the multifunction machine shown in FIG. 2.

FIG. 2 is an external view showing an example of an image forming device which is a composing element of the image forming system of FIG. 1. The image forming device shown in FIG. 2 is installed in a convenience store or the like and is used by an unspecified user. FIG. 3 is a block diagram showing an internal configuration of the multifunction machine 101 shown in FIG. 2.

As shown in FIG. 3, the multifunction machine 101 as one aspect of the image forming device includes a main body operator 102B, a scanner 15, a controller 11, a memory 30, a communication interface circuit 24, and an image forming mechanism 13. The memory 30 includes a ROM 30m and a RAM 30d. The image forming mechanism 13 includes an image processing circuit 20, an image former 13d, and a paper conveyer 13t.

As shown in FIG. 2, a cabinet including a money processing machine 105, an extension operator 102A, and a card reader 107 is arranged adjacent to the left side of the multifunction machine 101. The money processing machine 105 executes the settlement process of the printing fee paid by the user who uses the multifunction machine 101. The extension operator 102A includes a liquid crystal display and a touch panel as display elements, and accepts a user's operation. The card reader 107 is an interface for connecting a storage medium such as a memory card or a USB memory thereby to read/write data.

As shown in FIG. 2, the main body operator 102B is provided on the front side of the multifunction machine 101. The main body operator 102B includes a liquid crystal display and a touch panel as display elements, and accepts the user's operation.

The controller 11 recognizes the user's operation on the extension operator 102A and the main body operator 102B, and displays, on the liquid crystal display of the extension operator 102A and of the main body operator 102B, any information related to the state of the multifunction machine 101 and related to the money process of the money processing machine 105, and any information related to the received user's operation.

Further, as a different aspect, it is conceivable that the extension operator 102A is integrated with the main body operator 102B and such an integration is provided as one operator.

The controller 11 recognizes the state of each part of the multifunction machine 101 and controls the operation. Specifically, the controller 11 is composed of hardware resources such as a built-in memory, an input/output interface circuit, and a timer circuit, with a CPU (Central Processing Unit) or an MPU (Micro Processing Unit) as main component. Hereinafter, for the sake of simplicity, the CPU and the MPU are collectively referred to as CPU in this specification. When the CPU executes an image processing program stored in the memory, any function related to image formation of the multifunction machine 101 such as reading a document and printing data are realized. Further, the controller 11 receives the user's operation on the extension operator 102A and the main body operator 102B, and controls the screen of the liquid crystal display.

From the functional viewpoint of the process executed by the CPU, the controller 11 controls the reading of the document and the printing of the data. Further, the controller 11 controls the display and operation of the extension operator 102A and the main body operator 102B.

Further, the controller 11 accesses the ROM 30m and the RAM 30d of the memory 30. A flash memory can be given as an example of the hardware constituting the ROM 30m. The CPU reads out the control program stored in a non-volatile memory 11m and appropriately deploys the control program to the RAM 30d. Then, the process according to the control program deployed to the RAM 30d is executed. Then, the hardware included in the multifunction machine 101 is controlled. The controller 11 also controls operations and displays. Further, the controller 11 controls communication with an external device executed via the communication interface circuit 24. That is, software resources and hardware resources cooperate to realize a function related to image formation.

The controller 11 and the image forming mechanism 13, and the controller 11 and the scanner 15 are respectively connected so that data can be transferred. The memory 30 and the communication interface circuit 24 are also connected so that data can be transferred.

The scanner 15 reads an image of a document placed on a platen under the control of the controller 11 and converts the image into an image signal. That is, the scanner 15 executes image reading processes in copy job, fax job, and scan job.

The image processing circuit 20 generates image data based on the image signal output by the scanner 15. Alternatively, image data for printing is generated based on the data received via the communication interface circuit 24. Then, the generated image data is printed by the image forming mechanism 13 or sent to an external device via the communication interface circuit 24.

As shown in FIG. 2, the multifunction machine 101 includes four paper trays 17a, 17b, 17c, 17d and an ejection tray 18.

The paper trays 17a, 17b, 17c, 17d individually accommodate sheets of various sizes. For example, paper trays 17a, 17b, 17c, 17d accommodate respective A4, A3, B5, B4 size papers.

Under the control of the controller 11, the paper conveyer 13t shown in FIG. 3 feeds and conveys the sheets accommodated in any of the paper trays.

Under the control of the controller 11, the image former 13d prints the specified image data on the sheet supplied from any of the paper trays 17a, 17b, 17c, 17d. Examples of the print job related to printing include those related to printing as a printer, those related to printing as a copy, those related to printing by fax reception, and the like.

The paper conveyer 13t conveys the sheet printed by the image former 13d to the discharge tray 18 and discharges the sheet.

The communication interface circuit 24 is an interface for communicating data with an external device via a network. Short-range wireless communication with the smartphone 150 is also executed via the communication interface circuit 24. In addition, wireless or wired LAN communication with the external device 130 is also executed via the communication interface circuit 24.

Next, the smartphone 150, which is one of the composing elements of image formation in this embodiment, will be described.

Figure 4:
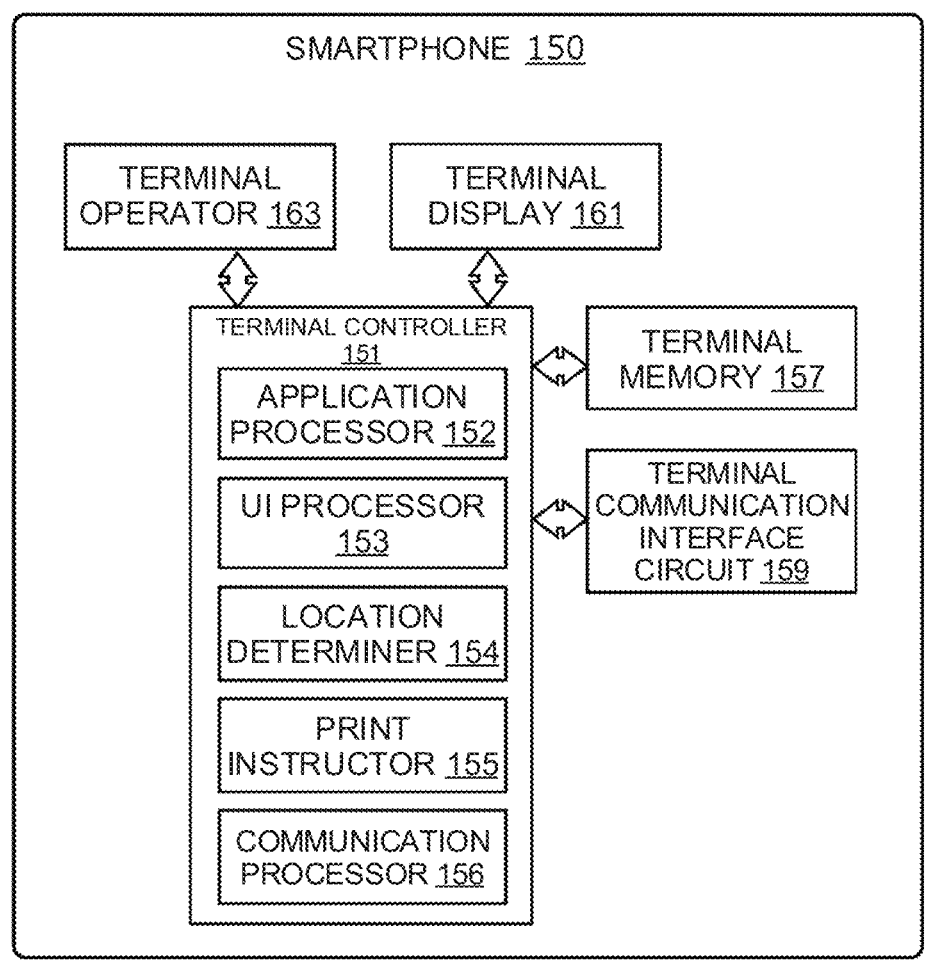
FIG. 4 is a block diagram showing a configuration of a smartphone as an example of a mobile communication terminal which is a composing element of the image forming system of FIG. 1.

FIG. 4 is a block diagram showing a configuration of the smartphone 150 in this embodiment. As shown in FIG. 4, the smartphone 150 includes a terminal controller 151, a terminal memory 157, and a terminal communication interface circuit 159.

The smartphone 150 further includes a terminal display 161 and a terminal operator 163.

The terminal controller 151 is mainly composed of a CPU. From the functional viewpoint of the process executed by the CPU, the terminal controller 151 includes the following composing elements. That is, an application processor 152, a UI processor 153, a location determiner 154, a print instructor 155, and a communication processor 156 are included.

The application processor 152 executes the application installed on the smartphone 150.

The UI processor 153 recognizes the user's input operation to the terminal operator 163. Further, the UI processor 153 causes the terminal display 161 to display the information related to the user's operation and the information related to the communication received by the terminal operator 163.

The functions of the location determiner 154 and the print instructor 155 will be described in the following printing flow.

The communication processor 156 controls communication with an external device via the terminal communication interface circuit 159.

The terminal memory 157 stores a processing program and data executed by the CPU. The terminal communication interface circuit 159 is an interface for communicating data with an external device via a network.

Flow of Printing from Smartphone

Subsequently, the flow of the process of printing from the smartphone 150 will be described. FIGS. 5A to 5E are flowcharts showing a flow of processes for causing the multifunction machine 101 to print from the smartphone 150 in this embodiment. Hereinafter, the process flow will be described according to the flowchart.

Wireless Connection of Smartphone with Multifunction Machine

First, the user operates the smartphone 150 thereby to activate the pre-installed print service application (step S11 shown in FIG. 5A). The print service application is provided by, for example, a business operator that manufactures the multifunction machine 101. In response to the operation of starting the application, the UI processor 153 launches the print service application. When the print service application is started and the terminal controller 151 as the application processor 152 starts executing the print service application, the terminal controller 151 as the communication processor 156 requests a communication connection with the multifunction machine 101 that executes printing (step S13). In this embodiment, it is assumed that both are connected by the above short-range wireless communication (for example, Wi-Fi communication).

Figure 6:
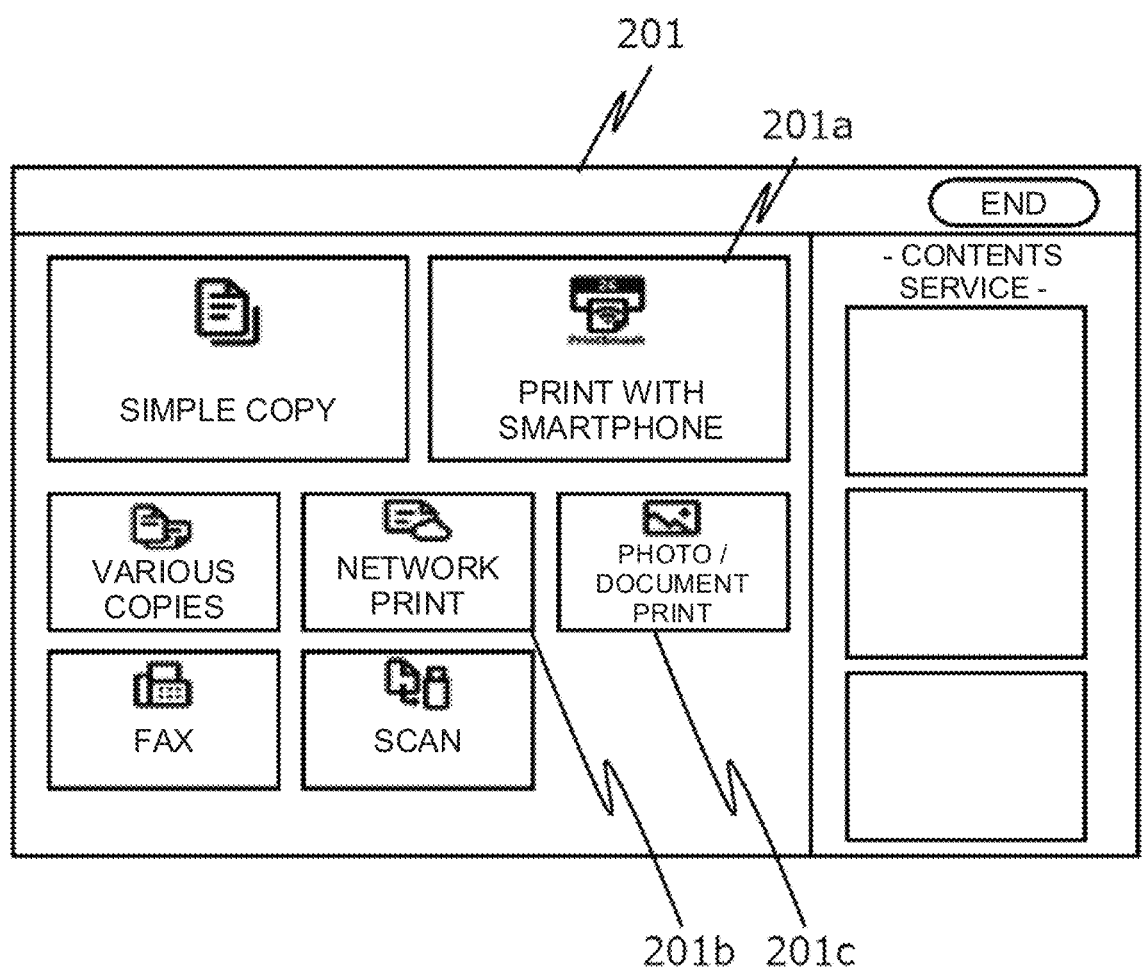
FIG. 6 is an explanatory view showing an example of a portal screen displayed on the operator, in the embodiment of the present invention.

On the other hand, after the power is turned on, the controller 11 of the multifunction machine 101 displays the portal screen on the liquid crystal display device of the extension operator 102A and stands by. FIG. 6 is an explanatory view showing an example of a portal screen displayed on the extension operator 102A in this embodiment. As shown in FIG. 6, on the portal screen 201, buttons for selecting various services related to copying, printing, faxing, and scanning are arranged. Further, on the right side of the screen, buttons for selecting various services related to printing of contents are arranged. Among the buttons for selecting various services, those belonging to the print service are a "print with smartphone" button 201a, a "network print" button 201b, and a "photo/document print" button 201c.

The "print with smartphone" button 201a relates to selection of a process that sends the data, which is stored in the terminal memory 157 of the smartphone 150, from the smartphone 150 to the multifunction machine 101, and executes printing. The "network print" button 201b relates to selection of a process that prints the data stored in the external device capable of communicating with the multifunction machine 101 via the communication interface circuit 24. The "photo/document print" button 201c relates to selection of a service that reads, via the card reader 107, photo/document data stored in a memory card or USB memory, and executes printing.

When the controller 11 recognizes that the user has touched the "print with smartphone" button 201a (step S111 in FIG. 5A), the controller 11 waits for a request for wireless connection by short-range wireless communication (step S113). Then, the communication connection with the smartphone 150 requesting the communication connection in the above step S13 is established (step S115).

On the side of the smartphone 150, the terminal controller 151 as the communication processor 156 recognizes that the communication connection with the multifunction machine 101 has been established (Yes in step S15). Then, the terminal controller 151 as the application processor 152 displays on the terminal display 161 that the communication with the multifunction machine 101 has been established, notifies the user thereof, and prompts the user to specify the to-be-printed data (step S17).

When the communication connection has been established, the controller 11 may display the fact on the extension operator 102A on the side of the multifunction machine 101 as well.

When the terminal controller 151 as the UI processor 153 recognizes the operation, by the user, of specifying the to-be-printed data by operating the smartphone 150 (Yes in step S19), the following process is executed. That is, the terminal controller 151 as the location determiner 154 determines whether or not the print data (hereinafter, also referred to as target data) specified by the user is stored in the terminal memory 157 (step S21 in FIG. 5B). For example, a case where the image data to be printed by the photo album application that manages the image data of the photograph taken by the smartphone 150 is specified by the user is given as a specific example. In that case, the location determiner 154 acquires an attribute of the data specified from the photo album application. Then, it is determined, based on the attribute, whether or not the target data is stored in the terminal memory 157.

As described above, on the portal screen 201 of FIG. 6, the user has selected the "print with smartphone" button 201a. That is, the user believes that the target data is stored in the smartphone 150. However, the actual target data may be stored in the cloud server 133 on the network, instead of the terminal memory 157 of the smartphone 150. The meaning of executing the determination in step S21 lies here.

When it is determined that the target data is stored in the terminal memory 157 of the smartphone 150 (Yes in step S21), the user's understanding matches the location of the target data. In that case, to the multifunction machine 101, the terminal controller 151 as the print instructor 155 sends, by the short-range wireless communication, the information related to the print setting, together with the print instruction. Further, the target data stored in the terminal memory 157 is sent to the multifunction machine 101 (step S23). Then, the process related to the print service on the side of the smartphone 150 is completed.

Here, the information related to the print setting includes the attribute of the target data and the information set by the user by using the print service application. Examples of the information set by the user include a setting related to full-color printing or monochrome printing, a setting related to single-sided printing or double-sided printing, and a setting related to the finished paper size.

When receiving a print instruction from the smartphone 150 (Yes in step S121 of FIG. 5B), the controller 11 of the multifunction machine 101 determines whether or not the target data, that is, the substance of the to-be-printed data has been received from the smartphone 150 (step S123).

Figure 5C:
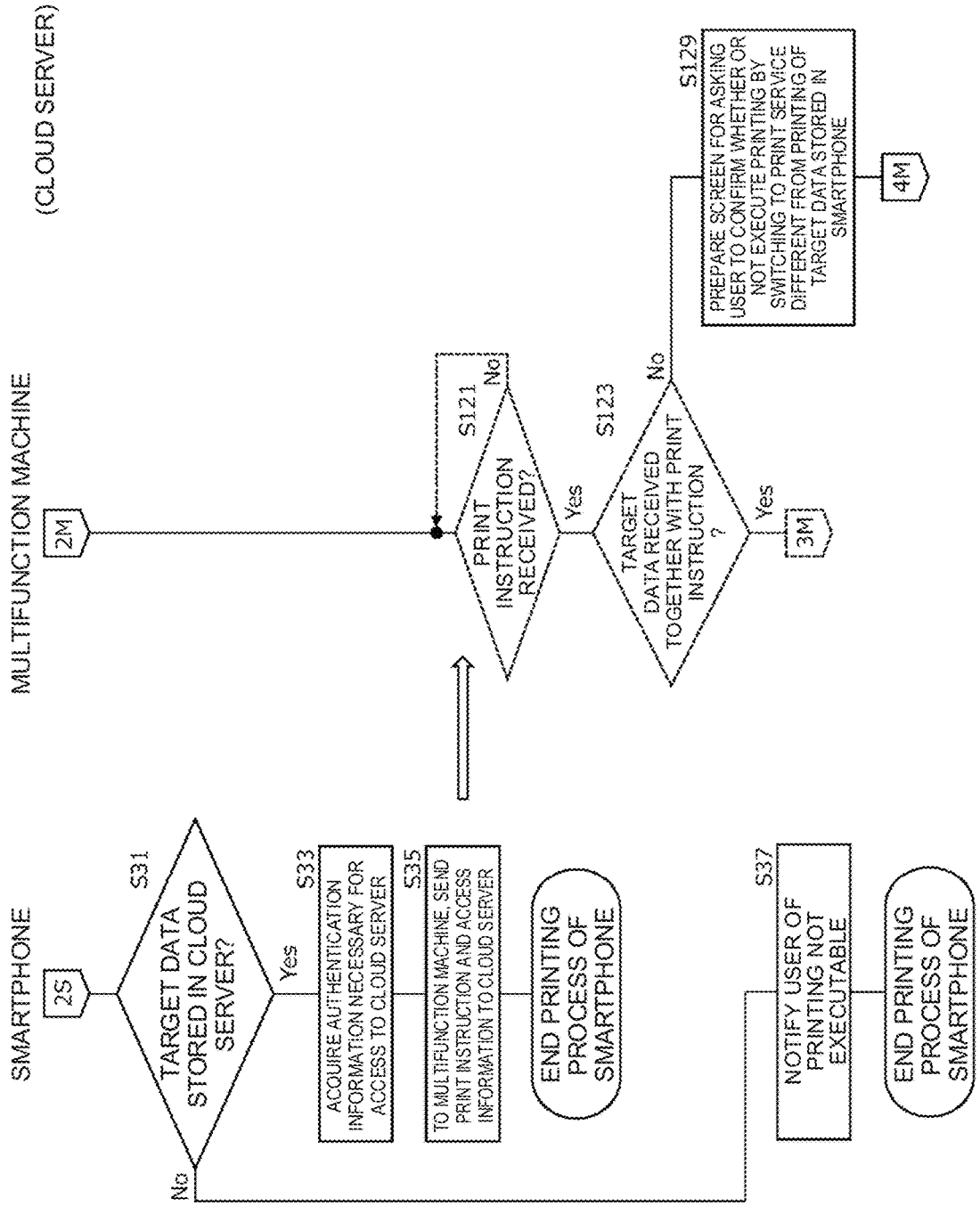
FIG. 5C is a third flowchart showing a flow of processes for executing an operation related to printing from a smartphone, in the embodiment of the present invention.
Figure 5D:
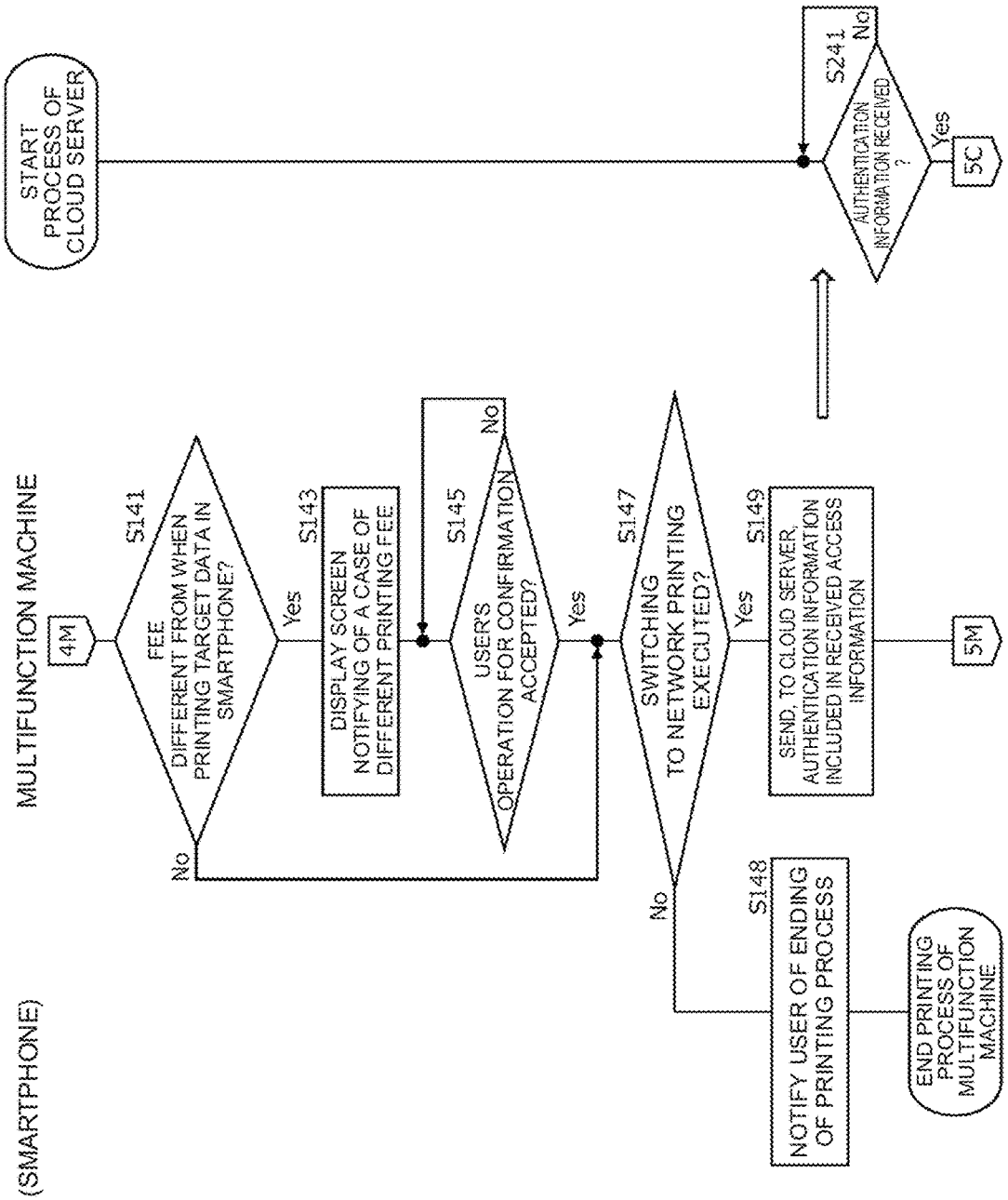
FIG. 5D is a fourth flowchart showing a flow of processes for executing an operation related to printing from a smartphone, in the embodiment of the present invention.

In the process shown in FIG. 5B, the target data is stored in the smartphone 150 (see determination in step S21). Therefore, the target data is sent from the smartphone 150. The determination in step S123 in FIG. 5B is always Yes. The case where this determination is No is the determination in step S123 in FIG. 5C, which will be described below.

When receiving the target data from the smartphone 150, the controller 11 sets the print according to the setting information included in the print instruction (step S125), and prints the target data (step S127). Then, the process related to the print service on the side of the multifunction machine 101 is completed.

On the other hand, when it is determined in step S21 described above that the target data is not stored in the terminal memory 157 of the smartphone 150 (No in step S21), the terminal controller 151 as the location determiner 154 determines whether or not the data is stored in the cloud server 133 (step S31 in FIG. 5C). Regarding the image data of the above photograph, the location determiner 154 acquires the attribute of the data specified from the photo album application, and determines, based on the attribute, whether or not the target data is stored in the cloud server 133.

When it is determined that the target data is stored in the cloud server 133 (Yes in step S31), the terminal controller 151 as the print instructor 155 acquires the authentication information for accessing the cloud server 133 (step S33). The cloud server 133 usually limits access to the stored data to authenticated users, except for publicly open data.

The authentication information is information necessary for accessing the target data through the authentication process executed by the cloud server 133, and is, for example, an ID and password of a user who is permitted to access the photo album. A different example is a one-time password sent by the cloud server 133 during a two-step login. The authentication information may be preliminarily stored in the terminal memory 157 as encrypted data, for example. An aspect of storing the user's ID and password in this way is known. As a different aspect, the terminal controller 151 as the UI processor 153 may accept the input of the authentication information from the user each time (third embodiment). A one-time password that, each time of authentication, uses a password with a different content belongs to this aspect.

The terminal controller 151 as the print instructor 155 generates, as access information, information necessary for accessing the target data stored in the cloud server 133. The access information includes device specific information which is information for identifying the cloud server 133 on the network. The access information further includes data specific information which is information for specifying the target data, among the data stored in the cloud server 133. The access information also includes the acquired authentication information.

By the short-range wireless communication, the terminal controller 151 as the print instructor 155 sends, to the multifunction machine 101, the information that is related to the print setting, together with the print instruction. Further, the access information related to the target data is sent to the multifunction machine 101 (step S35). Then, the process related to the print service on the side of the smartphone 150 is completed.

On the other hand, when it is determined in step S31 described above that the target data is not stored in the cloud server 133 (No in step S31), the following process is executed. The terminal controller 151 as the application processor 152 notifies the user that the location of the target data cannot be specified and printing cannot be executed (step S37). Then, the process related to the print service on the side of the smartphone 150 is completed.

The process of the multifunction machine 101 that receives the print instruction from the smartphone 150 in step S35 described above will be described.

When the smartphone 150 executes the process of step S35, the multifunction machine 101 is waiting for the print instruction to be sent from the smartphone 150. That is, the multifunction machine 101 remains in the state of step S121 in FIG. 5B. In order to show that the process is the same as that of step S121 in FIG. 5B, step S121 in FIG. 5C is shown by a chain line. Upon receiving the print instruction from the smartphone 150 (Yes in step S121 of FIG. 5C), the controller 11 of the multifunction machine 101 determines whether or not the target data has been received from the smartphone 150 (step S123 of FIG. 5C). The step S123 of FIG. 5C is shown by a chain line for the purpose of showing that the process is the same as that of step S123 of FIG. 5B.

In the process of step S123 of FIG. 5C, the target data is not sent from the smartphone 150. This is because the target data is stored in the cloud server 133 (see determination in step S31). Therefore, the determination in step S123 in FIG. 5C is always No. The case where this determination is Yes is the process of step S123 in FIG. 5B as described above.

Upon receiving, from the smartphone 150, the access information related to the target data, together with the print instruction (Yes in step S123), the controller 11 determines that the target data is stored in the cloud server 133.

On the portal screen 201 shown in FIG. 6, the "print with smartphone" button 201a selected by the user is a service that sends, to the multifunction machine 101, data stored in the terminal memory 157 of the smartphone 150, and executes printing. However, the process of printing the data stored in the cloud server 133 capable of communicating with the multifunction machine 101 via the communication interface circuit 24 belongs to the flow of the process selected by the "network print" button 201b.

Here, the controller 11 prepares a screen that accepts an instruction from the user to finally execute the printing, including a process of switching from the service related to "print with smartphone" selected by the user to the service related to "network print" (step S129). The screen also accepts operations such as setting the number of copies to print, displaying the total amount of money according to the set number of copies to print, previewing printing, and canceling printing.

Between the service related to "print with smartphone" and the service related to "network print" which are selected by the user on the portal screen 201 shown in FIG. 6, the printing unit price may differ in at least a part of the paper size, or in at least a part of type of print such as color/monochrome types. Therefore, the controller 11 determines whether or not the printing unit price of the service related to "print with smartphone" may differ from the printing unit price of the service related to "network print" (step S141 in FIG. 5D).

When it is determined that the printing unit price may be different (fourth embodiment) (Yes in step S141), the extension operator 102A is displayed to that effect and the user is notified thereof (step S143).

Figure 7A:
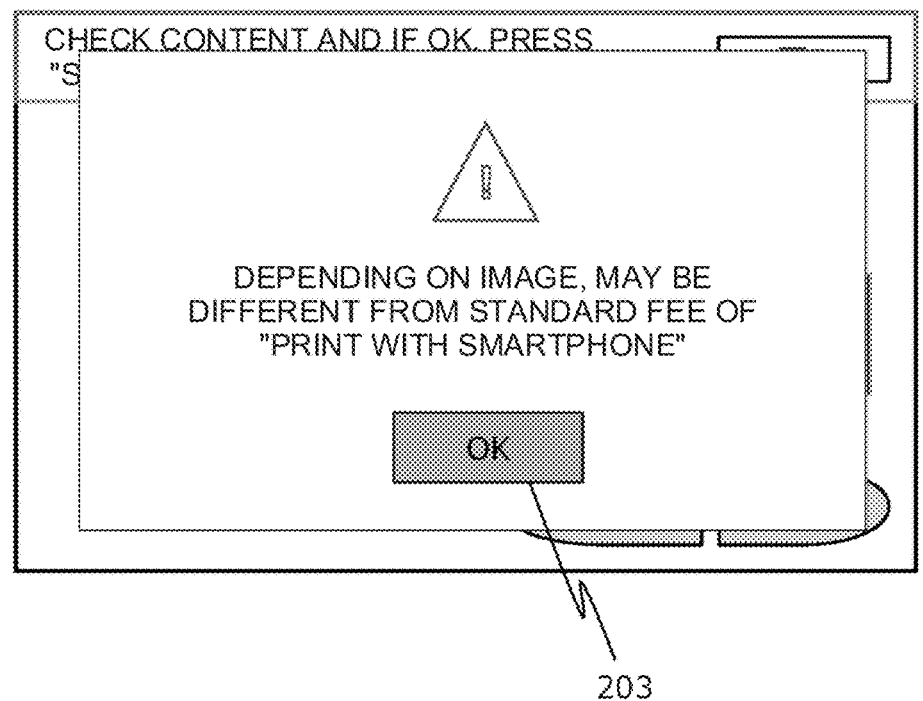
FIG. 7A is an explanatory view showing an example of a screen that notifies the user of the case where the printing unit price may be different between "printing with smartphone" and "network printing", in the embodiment of the present invention.

FIG. 7A is an explanatory view showing an example of a screen that notifies the user of the case where the printing unit price may be different between "printing with smartphone" and "network printing".

When the user confirms the notification and touches an "OK" button 203 (Yes in step S145), the controller 11 causes the extension operator 102A to display the screen prepared in step S129 described above. Then, the controller 11 waits for the user's instruction regarding the execution of printing (step S147).

Figure 7B:
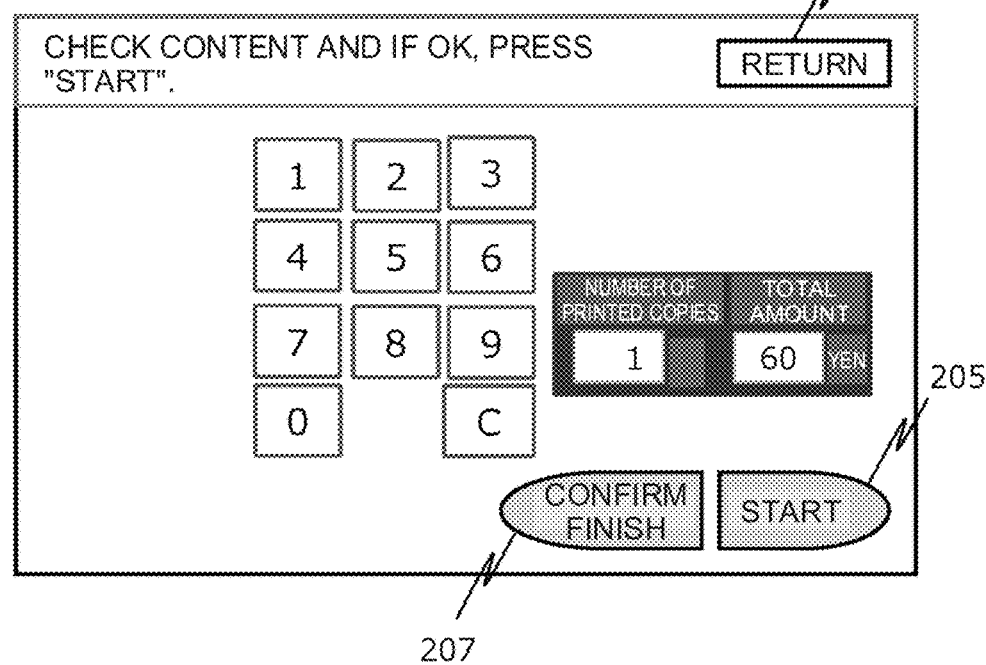
FIG. 7B is an explanatory view showing a screen that accepts setting of the number of copies to be printed, displays the total amount of money corresponding to the number of copies to be printed, and asks a user to confirm whether or not to execute printing, in the embodiment of the present invention. (When the printing fee may change).

FIG. 7B is an explanatory view showing a screen that is displayed on the extension operator 102A in the process of step S147, accepts again the setting (change) of the number of copies to be printed, displays the total amount according to the number of copies to be printed, and asks the user to confirm whether or not to execute printing. The total amount shown in FIG. 7B is an amount (60 yen) corresponding to the printing after the switching from the service related to "printing with smartphone" to "network printing". Further, the controller 11 displays, on the screen of FIG. 7B, a "start" button 205 that is operated when printing is executed, and a "finish confirmation" button 207 that displays a print preview on the extension operator 102A. Further, the execution of printing is stopped, and a "return" button 209 for switching to the portal screen 201 of FIG. 6 is displayed. Thus far, the fourth embodiment in which the printing unit price is different has been described.

On the other hand, in the determination in step S141 described above, when the controller 11 determines that the printing unit price of the service related to "print with smartphone" is the same as the printing unit price of the service related to "network print" (not applicable to the fourth embodiment) (No in step S141), the controller 11 executes the following process. The controller 11 causes the extension operator 102A to display the screen prepared in step S129 described above (see FIG. 8). In this case, the total amount of print is an amount (50 yen) same as that of the "print with smartphone" selected by the user.

Figure 8:
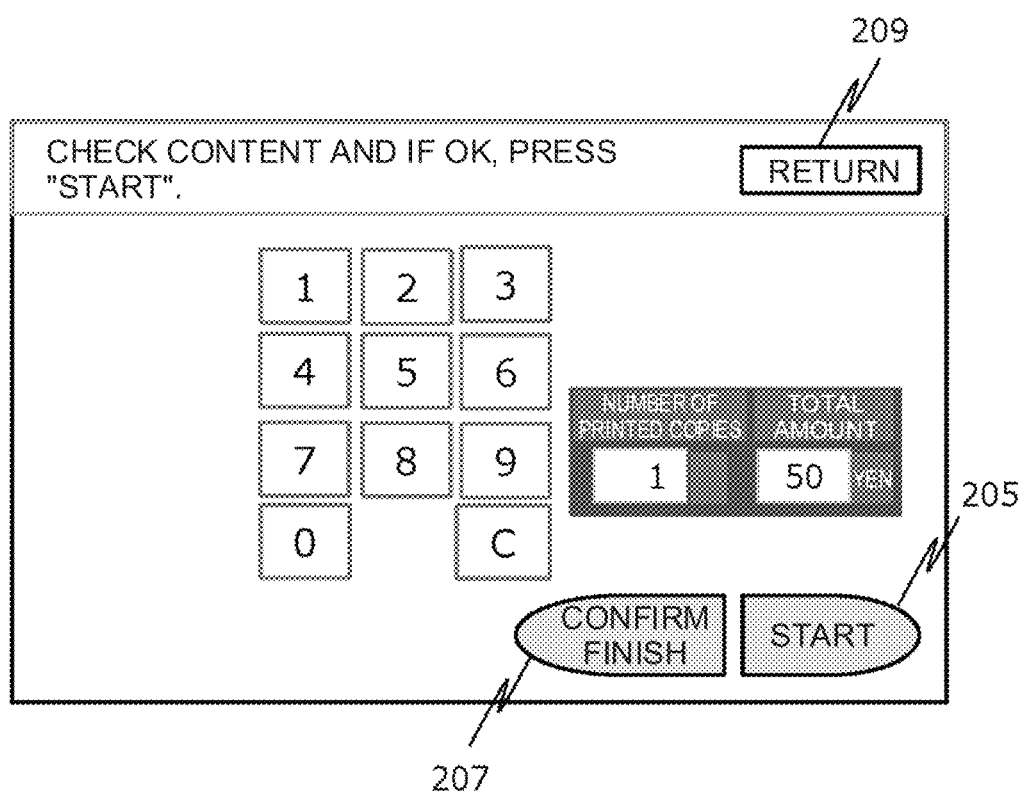
FIG. 8 is an explanatory view showing a screen showing a screen that accepts setting of the number of copies to be printed, displays the total amount of money corresponding to the number of copies to be printed, and asks the user to confirm whether or not to execute printing, in the embodiment of the present invention. (When the printing fee does not change).

As described above, in the process of step S147 in which the screen shown in FIG. 7B or FIG. 8 is displayed on the extension operator 102A and the user's instruction related to the execution of printing is awaited, when the operation of touching the "return" button 209 is accepted (No in step S147), the controller 11 executes the following process. That is, a display notifies the user that the printing execution is to be completed (step S148), and the process related to the print service on the multifunction machine 101 side is completed. The portal screen 201 of FIG. 6 is displayed on the extension operator 102A thereby to accept selection of a new service.

Further, in the process of step S147, when accepting the operation of touching the "start" button 205 (Yes in step S147), the controller 11 executes the following process. That is, the authentication information included in the access information received from the smartphone 150 is sent to the cloud server 133 thereby to request the authentication process (step S149). Here, in order to specify the cloud server 133 as the destination of sending the authentication information, the controller 11 uses the device specific information included in the access information.

Upon receiving the authentication request from the multifunction machine 101, the cloud server 133 executes the authentication process (Yes in step S241) thereby to authenticate the multifunction machine 101. When the authentication is completed, the multifunction machine 101 is notified to that effect (step S251 in FIG. 5E).

Upon receiving the notification of the completion of authentication (Yes in step S151 in FIG. 5E), the controller 11 of the multifunction machine 101 requests of the cloud server 133 for the target data (step S153). In order to specify and request the target data among the data stored in the cloud server 133, the controller 11 uses the data specific information included in the access information.

The cloud server 133 having received the request for the target data from the multifunction machine 101 (Yes in step S253) sends the requested target data to the multifunction machine 101 (step S255), and ends the process related to the print service on the cloud server 133 side.

Upon receiving the target data from the cloud server 133 (Yes in step S155), the controller 11 of the multifunction machine 101 executes the following process. That is, the controller 11 sets the printing according to the setting information included in the print instruction received from the smartphone 150 in step S121 described above (step S157), and executes the printing of the target data (step S159). Then, the process related to the print service on the side of the multifunction machine 101 is completed.

The above is the flow of processes related to the printing.

Figure 9:
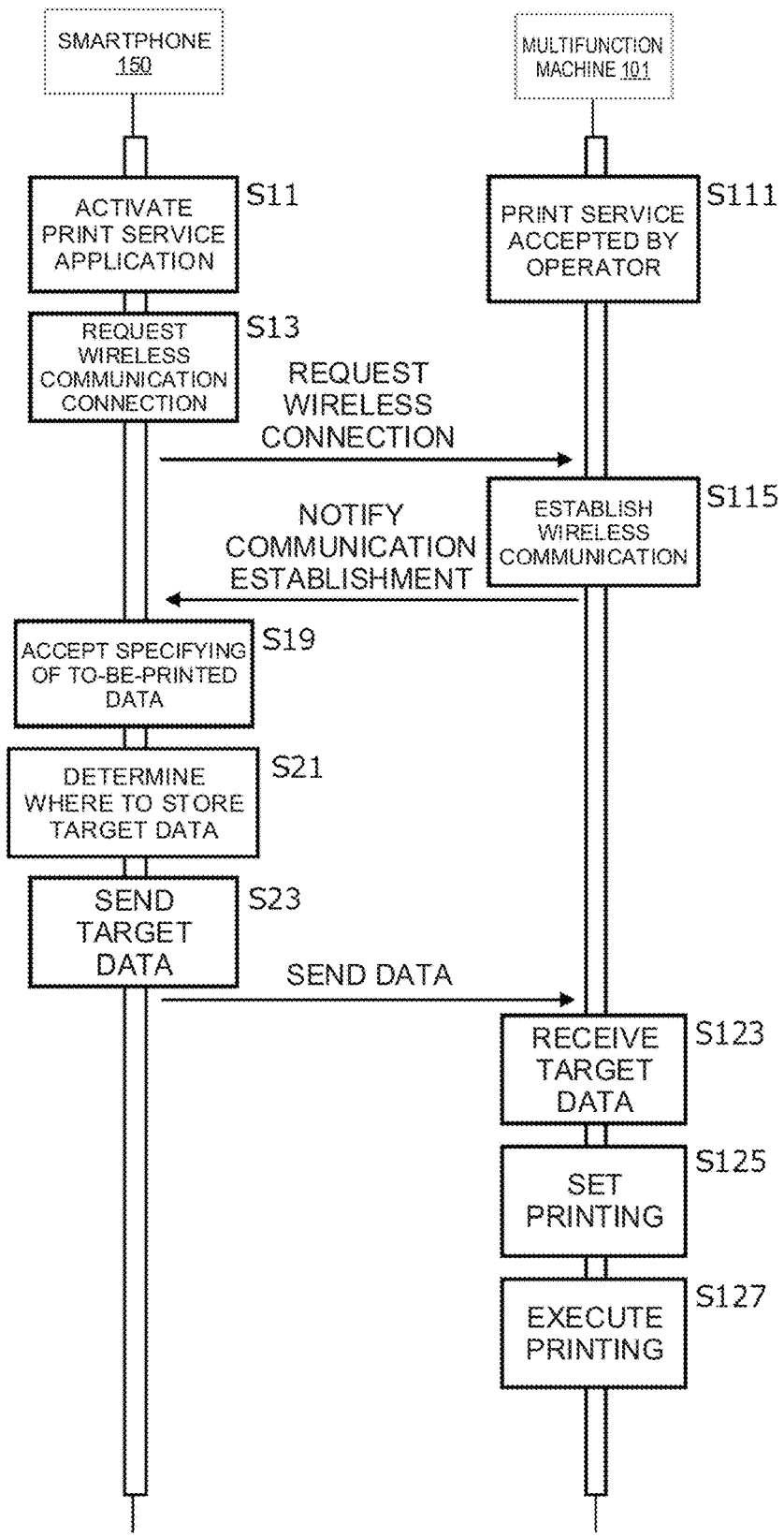
FIG. 9 is a sequence diagram corresponding to the processes shown in FIGS. 5A to 5E (when the target data is stored in the smartphone).
Figure 10A:
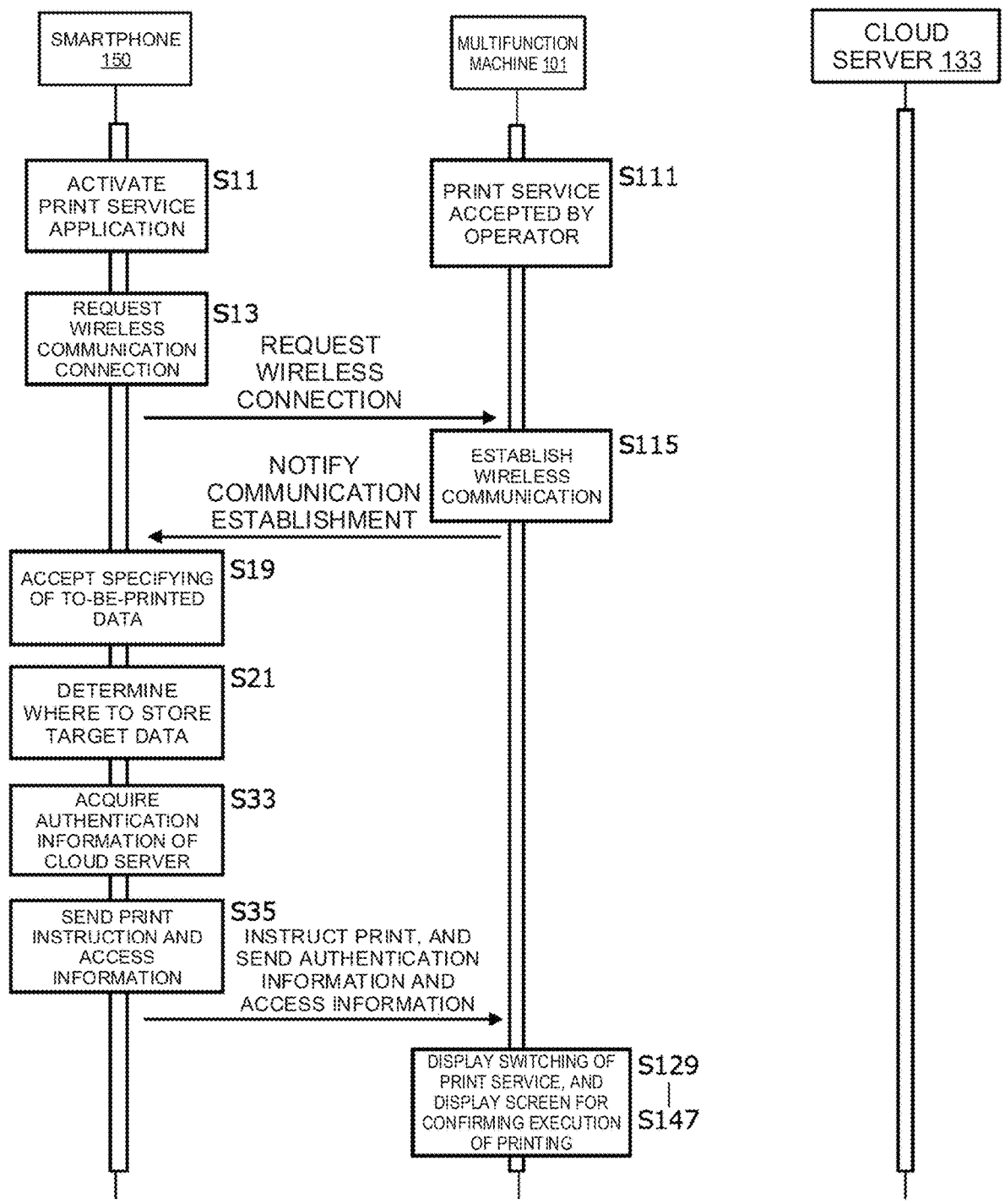
FIG. 10A is a first sequence diagram corresponding to the processes shown in FIGS. 5A to 5E (when the target data is stored in the cloud server).
Figure 10B:
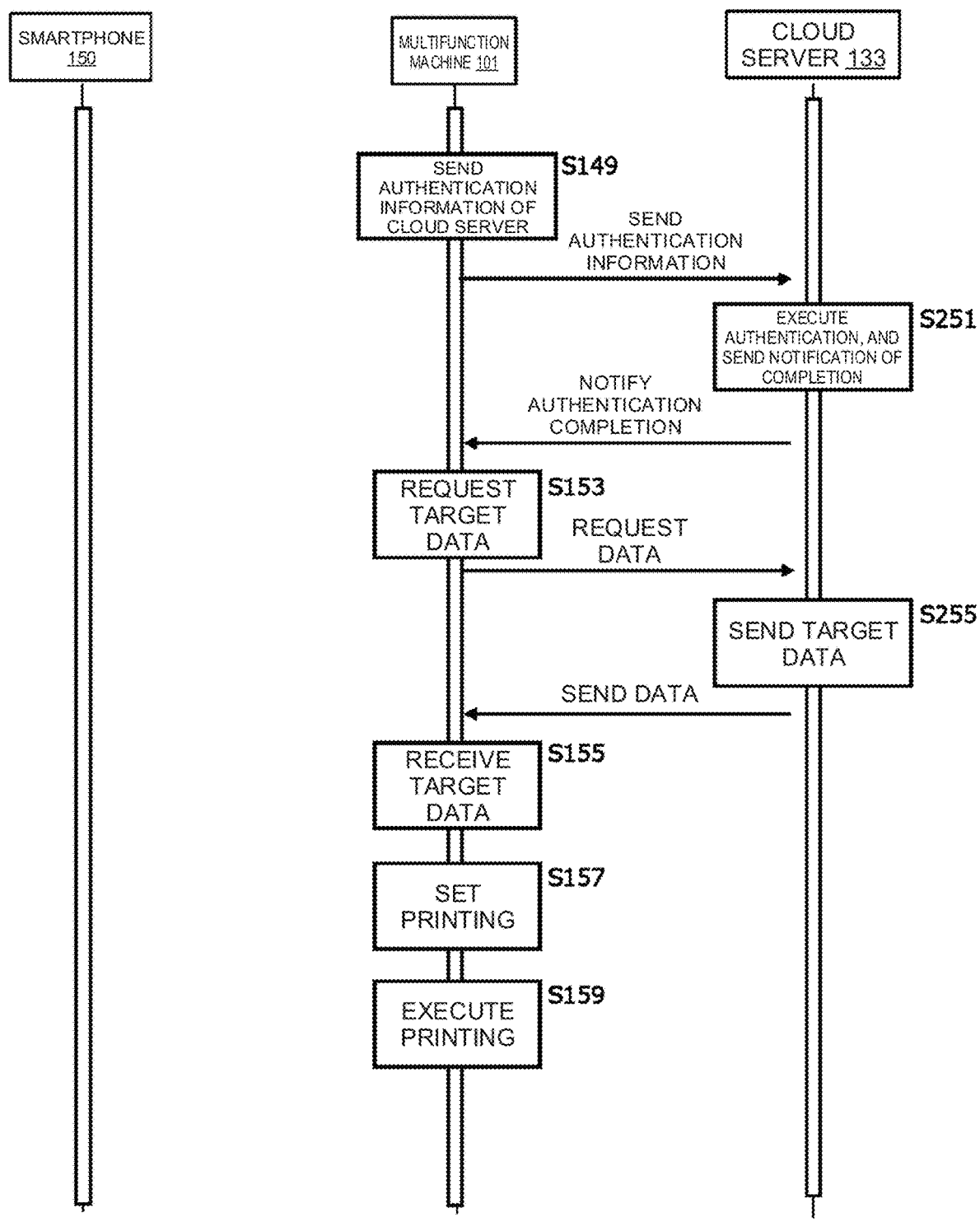
FIG. 10B is a second sequence diagram corresponding to the processes shown in FIGS. 5D and 5E (when the target data is stored in the cloud server).

FIGS. 9, 10A and 10B are sequence diagrams showing the printing processes shown in the flowcharts of FIGS. 5A to 5E. FIG. 9 shows a process seen when the target data is stored in the terminal memory 157 of the smartphone 150. FIGS. 10A and 10B show processes seen when the target data is stored in the cloud server 133. Each of the processes shown in FIGS. 9, 10A and 10B is given codes of the processes corresponding to those of the flowcharts of FIGS. 5A to 5E. When a plurality of processes correspond, the code of the representative one is given. By referring to the codes, the correspondence with the flowchart can be easily understood.

In this way, even when the data with its printing instructed by the user operating the smartphone 150 is stored in the terminal memory 157 of the smartphone 150 or stored in the cloud server 133, the controller 11 switches the print service as needed and executes the process. The user can use the print service without being aware of the location of data storage.

About Second Embodiment

The flowcharts of FIGS. 5A to 5E and the sequence diagrams of FIGS. 9, 10A, and 10B are aspects in which the smartphone 150 and the multifunction machine 101 directly communicate with the cloud server 133, as shown by solid lines in FIG. 1.

Here, as shown by the chain line in FIG. 1, the flow of printing process will be described in the case where the external device includes the network print service server 131.

In the configuration of the second embodiment, the smartphone 150 and the multifunction machine 101 communicate with the cloud server 133 via the network print service server 131. The target data is stored in the terminal memory 157 or the cloud server 133.

Among them, in the case where the target data is stored in the terminal memory 157, the process is the same as in FIG. 9. Therefore, only the case where the target data is stored in the cloud server 133 will be described below.

The network print service server 131 ordinarily stores the to-be-printed data in the print service selected by the "network print" button 201b. However, in this embodiment, the target data is stored in the cloud server 133 associated with the photo album application that manages the photo data taken by the smartphone 150, for example. In that respect, the location of the target data differs from the location of the target data of a server used by an ordinary network print service.

In other words, in the ordinary network print service, the device specific information included in the access information points the network print service server 131. On the other hand, in this embodiment, the device specific information points the cloud server 133.

Figure 11B:
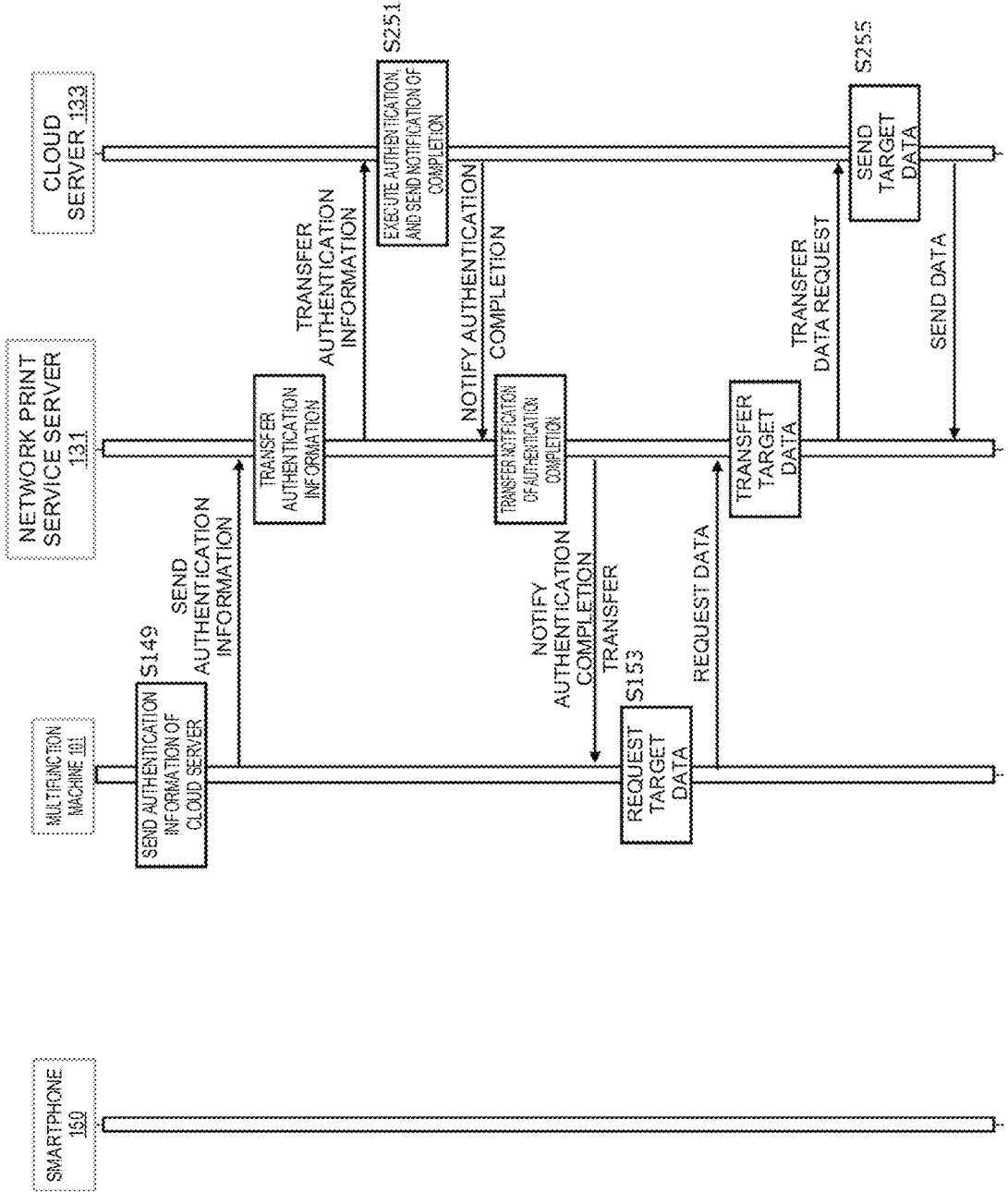
FIG. 11B is a second sequence diagram showing a flow of printing processes, in the embodiment of the present invention (when the target data of the cloud server is accessed via the print service server).

The sequence diagrams in the second embodiment are shown in FIGS. 11A to 11C. They correspond to the sequence diagrams of FIGS. 10A and 10B according to the first embodiment. That is, the target data of "print with smartphone" selected by the user is actually stored in the cloud server 133, and the printing process is executed by switching to the network print on the way.

The target data is stored in the cloud server 133 instead of the network print service server 131. However, the smartphone 150 and the multifunction machine 101 communicate with the network print service server 131. Therefore, the network print service server 131, which is present between the smartphone 150 and the multifunction machine 101, and the cloud server 133, relays the communication.

Each of the processes shown in FIGS. 11A to 11C is given the code of the corresponding process in the flowcharts of FIGS. 5A to 5E. For the process executed by the network print service server 131, there is no process corresponding to the flowcharts of FIGS. 5A to 5E. Therefore, the process executed by the network print service server 131 is not given a code. However, as is clear from FIGS. 11A to 11C, these processes relay communication between the multifunction machine 101 and the cloud server 133.

As described above, (i) An image forming system according to the present invention includes: a mobile communication terminal; and an image forming device, wherein the mobile communication terminal and the image forming device are capable of communicating with each other, the mobile communication terminal includes: a memory that stores data, a location determiner that accepts specifying of the data by a user and an instruction for printing the specified data and determines whether the data is stored in the memory or stored in an accessible external device, and a print instructor that, in a case where the data is stored in the memory, sends the stored data to the image forming device together with the print instruction, and in a case where the data is stored in the external device, sends access information, which is for accessing the data stored in the external device, to the image forming device together with the print instruction, and the image forming device includes: a controller that, in a case of receiving the data together with the print instruction, prints the received data, and in a case of receiving the access information together with the print instruction, acquires and prints the data stored in the external device.

In the present invention, the mobile communication terminal can store data in its own memory. In addition, data can be stored in an external device such as a cloud server connected via communication, and the data can be acquired. An example of a specific aspect thereof is a smartphone, a tablet terminal, or the like. However, the present invention is not limited to these, and includes a wide range of information processing devices having a communication function and having portability. The smartphone in the above embodiment corresponds to the mobile communication terminal of the present invention. The data includes data to be printed by the image forming device.

Further, the image forming device can communicate with a mobile communication terminal or an external device, and prints data, specified by the user, among the data stored in the memory or in the external device. A specific aspect thereof is, for example, a printer or a multifunction machine. In the above embodiment, the multifunction machine corresponds to the image forming device of the present invention.

The portable communication terminal and the image forming device may be connected by a fixed wired network, but preferably connected by standard wireless communication, such as Wi-Fi, Bluetooth (registered trademark), NFC (Near Field Communication), or the like. They are used for short-range communication where the communicating devices are within the user's field of view. They are a wireless communication that is mainly used at a communication distance such as in one store or indoors. In this specification, these are collectively referred to as short-range wireless communication.

Further, the functions of the location determiner and the print instructor included in the mobile communication terminal may be realized by the mobile communication terminal including a CPU and the CPU executing a program stored in the memory. Further, the function of the controller included in the image forming device may be realized by the image forming device including the CPU and the memory, and the CPU of the of the image forming device executing a program stored in the memory of the image forming device.

Further, a preferred aspect of the present invention will be described.

(ii) The access information may include device specific information that specifies the external device to be accessed and data specific information that specifies the specified data among the data stored in the external device.

In this way, the image forming device identifies the external device based on the received access information, further identifies the specified data among the data stored in the external device, and can accesses and print the specified data.

(iii) The external device executes an authentication process that permits access to the stored data, the print instructor acquires, from the external device, authentication information necessary for accessing the external device, the access information includes the authentication information acquired from the external device, and the controller uses the authentication information included in the access information and thereby may access the data stored in the external device.

In this way, the mobile communication terminal acquires the authentication information necessary for the information about access to the external device, includes it in the access information and provides it to the image forming device, the controller of the image forming device uses the provided authentication information thereby to cope with the authentication process for the external device, and can access the stored data.

(iv) The external device executes an authentication process that permits access to the stored data, the memory preliminarily stores the authentication information used for the authentication process, the access information further includes the authentication information stored in the memory, and the controller uses the authentication information included in the access information and thereby may access the data stored in the external device.

In this way, the mobile communication terminal preliminarily stores, in the memory, the authentication information necessary for the information about access to the external device, and the stored authentication information is included in the access information and is provided to the image forming device. Then, the image forming device uses the provided authentication information thereby to be authenticated for the external device, and can access the stored data.

(v) When a first printing fee for acquiring and printing the data stored in the external device is different from a second printing fee for printing the data stored in the memory, the controller, before acquiring and printing the data stored in the external device, may notify the user that the first printing fee is different from the second printing fee of the data received from the mobile communication terminal.

In this way, when a printing fee different from that of the case where the location of the to-be-printed data is at an external device and the data stored in the memory provided in the mobile communication terminal is printed is applied, the printing can be executed after preliminarily notifying the user that the printing fee will be different from when printing the data stored in the mobile communication terminal.

(vi) A preferred aspect of the present invention includes an image forming device including: a controller that receives a print instruction from an external mobile communication terminal capable of communicating and performs printing, wherein the mobile communication terminal has a memory, which stores data, and has a print instructor, the print instructor accepts specifying of the data by a user and an instruction for printing the specified data and determines whether the data is stored in the memory or stored in an accessible external device, in a case where the data is stored in the memory, sends the stored data together with the print instruction, and in a case where the data is stored in the external device, sends access information, which is for accessing the data stored in the external device, together with the print instruction, and the controller, in a case of receiving the data together with the print instruction, prints the received data, and in a case of receiving the access information together with the print instruction, acquires and prints the data stored in the external device.

(vii) A preferred aspect of the present invention includes a mobile communication terminal including: a memory that stores data; a location determiner that accepts specifying of the data by a user and an instruction for printing the specified data and determines whether the data is stored in the memory or stored in an accessible external device; and a print instructor that, in a case where the data is stored in the memory, sends the stored data to an image forming device together with the print instruction, and in a case where the data is stored in the external device, sends access information, which is for accessing the data stored in the external device, to the image forming device, together with the print instruction, wherein the image forming device is, with the data received together with the print instruction, caused to print the received data, and, with the access information received together with the print instruction, caused to acquire and print the data stored in the external device.

(viii) A preferred aspect of the present invention includes an image forming method including the following doings by a controller of a mobile communication terminal having a memory capable of storing data: accepting specifying of the data by a user and an instruction for printing the specified data; determining whether the specified data is stored in the memory or stored in an accessible external device; and in a case where the data is stored in the memory, sending the stored data to an image forming device together with the print instruction, and in a case where the data is stored in the external device, sending access information, which is for accessing the data stored in the external device, to the image forming device, together with the print instruction, and the image forming device is, with the data received together with the print instruction, caused to print the received data, and, with the access information received together with the print instruction, caused to acquire and print the data stored in the external device.

These preferred aspects of the present invention include one that combines any of a plurality of the embodiments described above.

Various modified examples of the present invention may be provided besides the above embodiments. The modified examples should not be construed as not belonging to the scope of the present invention. The present invention should include the meaning equivalent to the claims and all modifications within the scope.

What is claimed is:

1. An image forming system, comprising:
a mobile communication terminal; and
an image forming device,
wherein
the mobile communication terminal and the image forming device are capable of communicating with each other,
the mobile communication terminal includes:
a memory that stores data,
a location determiner that accepts specifying of the data by a user and an instruction for printing the specified data and determines whether the data is stored in the memory or stored in an accessible external device, and
a print instructor that, in a case where the data is stored in the memory, sends the stored data to the image forming device together with the print instruction, and in a case where the data is stored in the external device, sends access information, which is for accessing the data stored in the external device, to the image forming device, together with the print instruction, and
the image forming device includes:
a controller that, in a case of receiving the data together with the print instruction, prints the received data, and in a case of receiving the access information together with the print instruction, acquires and prints the data stored in the external device.

2. The image forming system according to claim 1, wherein the access information includes device specific information that specifies the external device to be accessed and data specific information that specifies the specified data among the data stored in the external device.

3. The image forming system according to claim 1, wherein
the external device executes an authentication process that permits access to the stored data,
the print instructor acquires, from the external device, authentication information necessary for accessing the external device,
the access information includes the authentication information acquired from the external device, and
the controller uses the authentication information included in the access information and thereby accesses the data stored in the external device.

4. The image forming system according to claim 1, wherein
the external device executes an authentication process that permits access to the stored data,
the memory preliminarily stores the authentication information used for the authentication process,
the access information further includes the authentication information stored in the memory, and
the controller uses the authentication information included in the access information and thereby accesses the data stored in the external device.

5. The image forming system according to claim 1, wherein
when a first printing fee for acquiring and printing the data stored in the external device is different from a second printing fee for printing the data stored in the memory, the controller, before acquiring and printing the data stored in the external device, notifies the user that the first printing fee is different from the second printing fee of the data received from the mobile communication terminal.

6. An image forming device, comprising:
a controller that receives a print instruction from an external mobile communication terminal capable of communicating and performs printing,
wherein
the mobile communication terminal has a memory, which stores data, and has a print instructor, the print instructor accepts specifying of the data by a user and an instruction for printing the specified data, determines whether the data is stored in the memory or stored in an accessible external device, and in a case where the data is stored in the memory, sends the stored data together with the print instruction, and in a case where the data is stored in the external device, sends access information, which is for accessing the data stored in the external device, together with the print instruction, and
the controller, in a case of receiving the data together with the print instruction, prints the received data, and in a case of receiving the access information together with the print instruction, acquires and prints the data stored in the external device.

7. A mobile communication terminal, comprising:
a memory that stores data;
a location determiner that accepts specifying of the data by a user and an instruction for printing the specified data and determines whether the data is stored in the memory or stored in an accessible external device; and
a print instructor that, in a case where the data is stored in the memory, sends the stored data to an image forming device together with the print instruction, and in a case where the data is stored in the external device, sends access information, which is for accessing the data stored in the external device, to the image forming device, together with the print instruction,
wherein
the image forming device is, with the data received together with the print instruction, caused to print the received data, and, with the access information received together with the print instruction, caused to acquire and print the data stored in the external device.

8. An image forming method, comprising the following by a controller of a mobile communication terminal having a memory capable of storing data:

accepting specifying of the data by a user and an instruction for printing the specified data;

determining whether the specified data is stored in the memory or stored in an accessible external device; and in a case where the data is stored in the memory, sending the stored data to an image forming device together with the print instruction, and in a case where the data is stored in the external device, sending access information, which is for accessing the data stored in the external device, to the image forming device, together with the print instruction, and the image forming device is, with the data received together with the print instruction, caused to print the received data, and, with the access information received together with the print instruction, caused to acquire and print the data stored in the external device.

* * * * *